US008756158B2

(12) United States Patent
Colvin et al.

(10) Patent No.: US 8,756,158 B2
(45) Date of Patent: Jun. 17, 2014

(54) CURRENCY RECYCLER

(75) Inventors: Randy Colvin, Hebron, OH (US);
Robert Norman, Sunbury, OH (US);
Jeffrey Siekman, Loveland, OH (US)

(73) Assignee: Fifth Third Bank, Cincinnati, OH (US)

( * ) Notice: Subject to any disclaimer, the term of this patent is extended or adjusted under 35 U.S.C. 154(b) by 0 days.

(21) Appl. No.: 13/618,601

(22) Filed: Sep. 14, 2012

(65) Prior Publication Data
US 2013/0218754 A1 Aug. 22, 2013

Related U.S. Application Data

(60) Provisional application No. 61/535,098, filed on Sep. 15, 2011.

(51) Int. Cl.
*G06Q 40/00* (2012.01)
(52) U.S. Cl.
USPC .............................. 705/43; 705/39
(58) Field of Classification Search
CPC ..... G06Q 20/1085; G06Q 19/20; G07F 19/20
USPC .............................. 705/42, 43, 39
See application file for complete search history.

(56) References Cited

U.S. PATENT DOCUMENTS

| 3,962,726 | A | 6/1976 | DeLand, Jr. |
| 4,542,287 | A | 9/1985 | Watanabe |
| 4,697,071 | A | 9/1987 | Hiraoka et al. |
| 4,944,619 | A | 7/1990 | Suzuki et al. |
| 4,949,192 | A | 8/1990 | McGeary |
| 5,010,240 | A | 4/1991 | Sheldon |
| 5,053,607 | A | 10/1991 | Carlson et al. |
| 5,247,159 | A | 9/1993 | Yuge et al. |
| 5,569,898 | A | 10/1996 | Fisher et al. |
| 5,685,657 | A | 11/1997 | Jablonski |
| 5,767,495 | A | 6/1998 | DeLand, Jr. |
| 5,814,796 | A | 9/1998 | Benson et al. |
| 5,829,743 | A | 11/1998 | DeLand, Jr. et al. |
| 5,903,881 | A | 5/1999 | Schrader et al. |
| 5,982,918 | A | 11/1999 | Mennie et al. |

(Continued)

FOREIGN PATENT DOCUMENTS

| EP | 1517274 A3 | 2/2006 |
| EP | 1486923 A3 | 7/2010 |

(Continued)

OTHER PUBLICATIONS

Employing optimized combinations of one-class classifiers for automated currency validation, He et al., 2004, pp. 1085-1096; <http://www.ScienceDirect.com/science/article/pii/S003132030400482>.

(Continued)

*Primary Examiner* — Jagdish Patel
(74) *Attorney, Agent, or Firm* — Erin J. Fox; Barnes & Thornburg LLP

(57) ABSTRACT

A cash recycler that is configured to allow deposited money to be dispensed (recycled) in a withdrawal transaction. In one embodiment, multiple currency recyclers could be used at multiple stores of a retail establishment and collectively work from one pending balance. Embodiments are also contemplated in which multiple accounts at one recycler location. In some cases, the currency recycler provides provisional credit for deposits of coinage and checks. In some cases, transactions made on the currency recycler could be settled to any financial institution.

9 Claims, 36 Drawing Sheets

(56) References Cited

U.S. PATENT DOCUMENTS

| | | |
|---|---|---|
| 5,991,410 A | 11/1999 | Albert et al. |
| 6,021,883 A | 2/2000 | Casanova et al. |
| 6,068,194 A | 5/2000 | Mazur |
| 6,098,881 A | 8/2000 | DeLand, Jr. et al. |
| 6,264,101 B1 | 7/2001 | Ryan et al. |
| 6,431,445 B1 | 8/2002 | Deland, Jr. et al. |
| 6,473,921 B2 | 11/2002 | Brooke et al. |
| 6,604,680 B2 | 8/2003 | Hamaguchi |
| 6,607,124 B1 | 8/2003 | Junkins et al. |
| 6,749,053 B2 | 6/2004 | Ikuta |
| 6,761,308 B1 | 7/2004 | Hanna et al. |
| 6,848,612 B2 | 2/2005 | Uematsu et al. |
| 6,899,269 B1 | 5/2005 | Deland |
| 6,978,926 B2 | 12/2005 | Kobayashi et al. |
| 6,983,836 B2 | 1/2006 | Adams et al. |
| 7,014,105 B2 | 3/2006 | Fujioka |
| 7,025,256 B2 | 4/2006 | Drummond et al. |
| 7,029,008 B2 | 4/2006 | Nishida et al. |
| 7,036,722 B2 | 5/2006 | Fujioka |
| 7,090,130 B2 | 8/2006 | DeLand, Jr. et al. |
| 7,213,745 B2 | 5/2007 | Smith et al. |
| 7,219,832 B2 | 5/2007 | Fillinger et al. |
| 7,328,844 B2 | 2/2008 | Workens |
| 7,350,699 B2 | 4/2008 | Gunst et al. |
| 7,428,985 B1 | 9/2008 | Moreland et al. |
| 7,455,183 B2 | 11/2008 | Nishida et al. |
| 7,481,360 B1 | 1/2009 | Ramachandran et al. |
| 7,487,874 B2 | 2/2009 | Nishida et al. |
| 7,520,421 B2 | 4/2009 | Salafia, III et al. |
| 7,523,856 B2 | 4/2009 | Block et al. |
| 7,537,153 B2 | 5/2009 | Hurwitz et al. |
| 7,568,615 B2 | 8/2009 | Corona et al. |
| 7,599,543 B2 | 10/2009 | Jones et al. |
| 7,610,215 B1 | 10/2009 | Folk |
| 7,635,085 B2 | 12/2009 | Brown et al. |
| 7,677,442 B2 | 3/2010 | Van Kirk et al. |
| 7,681,707 B2 | 3/2010 | Tabachnik |
| 7,778,456 B2 | 8/2010 | Jones et al. |
| 7,856,401 B2 | 12/2010 | Ross et al. |
| 7,873,576 B2 | 1/2011 | Jones et al. |
| 7,883,005 B2 | 2/2011 | Artino et al. |
| 7,900,829 B1 | 3/2011 | Folk et al. |
| 7,940,176 B2 | 5/2011 | Bohen et al. |
| 7,950,512 B2 | 5/2011 | Folk et al. |
| 7,954,699 B1 | 6/2011 | Sanders et al. |
| 7,965,184 B1 | 6/2011 | Nichols et al. |
| 7,975,910 B2 | 7/2011 | Artino et al. |
| 7,975,911 B2 | 7/2011 | Artino et al. |
| 7,980,378 B2 | 7/2011 | Jones et al. |
| 7,982,604 B2 | 7/2011 | Nichols et al. |
| 7,982,610 B1 | 7/2011 | Nichols et al. |
| 8,011,581 B1 | 9/2011 | Folk et al. |
| 8,015,455 B1 | 9/2011 | Vannatter et al. |
| 8,019,663 B1 | 9/2011 | Bohen et al. |
| 8,025,213 B2 | 9/2011 | Hartfield et al. |
| 8,025,214 B1 | 9/2011 | Folk et al. |
| 8,032,415 B2 | 10/2011 | Sanders et al. |
| 8,047,427 B2 | 11/2011 | Sanders et al. |
| 8,056,305 B1 | 11/2011 | Folk et al. |
| 8,070,055 B2 | 12/2011 | Block et al. |
| 8,078,534 B1 | 12/2011 | Nichols et al. |
| 8,094,021 B2 | 1/2012 | Nichols et al. |
| 8,096,398 B2 | 1/2012 | Folk et al. |
| 8,117,127 B1 | 2/2012 | Sanders et al. |
| 8,130,111 B2 | 3/2012 | Crowley et al. |
| 8,141,772 B1 | 3/2012 | Folk et al. |
| 8,157,078 B1 | 4/2012 | Folk et al. |
| 8,161,330 B1 | 4/2012 | Vannatter et al. |
| 8,162,124 B2 | 4/2012 | Tabachnik |
| 8,162,125 B1 | 4/2012 | Csulits et al. |
| 8,164,451 B2 | 4/2012 | Nichols et al. |
| 8,172,067 B1 | 5/2012 | Folk et al. |
| 8,175,970 B1 | 5/2012 | Mon et al. |
| 8,177,132 B1 | 5/2012 | Bohen et al. |
| 8,181,854 B1 | 5/2012 | Folk et al. |
| 8,181,856 B1 | 5/2012 | Folk et al. |
| 8,191,771 B2 | 6/2012 | Artino et al. |
| 8,196,826 B2 | 6/2012 | Folk |
| 8,201,680 B1 | 6/2012 | Folk et al. |
| 8,210,429 B1 | 7/2012 | Bohen et al. |
| 8,214,257 B1 | 7/2012 | Folk et al. |
| 8,214,290 B1 | 7/2012 | Vannatter et al. |
| 8,227,936 B1 | 7/2012 | Folk et al. |
| 8,229,816 B1 | 7/2012 | Mattison et al. |
| 8,249,989 B2 | 8/2012 | Allen |
| 8,260,669 B1 | 9/2012 | Folk et al. |
| 8,276,810 B2 | 10/2012 | Cole et al. |
| 8,327,995 B1 | 12/2012 | Folk et al. |
| 8,346,640 B1 | 1/2013 | Sanders et al. |
| 8,387,874 B1 | 3/2013 | Bohen et al. |
| 8,397,108 B1 | 3/2013 | Vannatter et al. |
| 8,407,119 B2 | 3/2013 | Folk et al. |
| 2001/0020638 A1 | 9/2001 | Uematsu et al. |
| 2001/0054643 A1 | 12/2001 | Siemens |
| 2002/0011393 A1 | 1/2002 | Siemens |
| 2003/0061162 A1 | 3/2003 | Matthews |
| 2003/0080185 A1 | 5/2003 | Werther |
| 2003/0083969 A1 | 5/2003 | Uchiyama et al. |
| 2003/0191708 A1 | 10/2003 | Turk |
| 2003/0196936 A1 | 10/2003 | Graef et al. |
| 2003/0220994 A1 | 11/2003 | Zhu |
| 2004/0039702 A1 | 2/2004 | Blair et al. |
| 2004/0059634 A1 | 3/2004 | Tami et al. |
| 2004/0107170 A1 | 6/2004 | Labrou et al. |
| 2004/0153408 A1 | 8/2004 | Jones et al. |
| 2004/0247169 A1 | 12/2004 | Ross et al. |
| 2004/0249718 A1 | 12/2004 | Kuroda et al. |
| 2004/0267666 A1 | 12/2004 | Minami et al. |
| 2005/0049950 A1 | 3/2005 | Johnson |
| 2005/0080731 A1 | 4/2005 | Dnyaneshwar |
| 2005/0108164 A1 | 5/2005 | Salafia, III et al. |
| 2005/0278239 A1 | 12/2005 | Jones et al. |
| 2006/0016884 A1 | 1/2006 | Block et al. |
| 2006/0022032 A1 | 2/2006 | Fillinger et al. |
| 2006/0089893 A1 | 4/2006 | Joseph et al. |
| 2006/0196926 A1 | 9/2006 | Benson et al. |
| 2007/0005467 A1 | 1/2007 | Haigh et al. |
| 2007/0045395 A1 | 3/2007 | Corona et al. |
| 2007/0063016 A1 | 3/2007 | Myatt et al. |
| 2007/0100750 A1 | 5/2007 | Hartfield et al. |
| 2007/0235523 A1 | 10/2007 | Clements |
| 2007/0240966 A1 | 10/2007 | Tabachnik |
| 2008/0005039 A1 | 1/2008 | Puthupparambil et al. |
| 2008/0106726 A1 | 5/2008 | Park |
| 2008/0149706 A1 | 6/2008 | Brown et al. |
| 2008/0265019 A1 | 10/2008 | Artino et al. |
| 2009/0166406 A1 | 7/2009 | Pigg et al. |
| 2009/0178598 A1 | 7/2009 | Meeker |
| 2009/0229950 A1 | 9/2009 | Nakamoto |
| 2009/0289105 A1 | 11/2009 | Block et al. |
| 2009/0309694 A1 | 12/2009 | Nichols et al. |
| 2009/0313057 A1 | 12/2009 | Slayton et al. |
| 2009/0320106 A1 | 12/2009 | Jones et al. |
| 2010/0010904 A1 | 1/2010 | Sanders et al. |
| 2010/0051687 A1 | 3/2010 | Jones et al. |
| 2010/0057617 A1 | 3/2010 | Jones et al. |
| 2010/0063916 A1 | 3/2010 | Jones et al. |
| 2010/0070392 A1 | 3/2010 | Brown et al. |
| 2010/0082355 A1 | 4/2010 | Folk et al. |
| 2010/0082443 A1 | 4/2010 | Folk et al. |
| 2010/0082483 A1 | 4/2010 | Sanders et al. |
| 2010/0092065 A1 | 4/2010 | Jones et al. |
| 2010/0127070 A1* | 5/2010 | Sanders et al. ............ 235/379 |
| 2010/0131374 A1 | 5/2010 | Sanders et al. |
| 2010/0131407 A1 | 5/2010 | Folk et al. |
| 2010/0174640 A1 | 7/2010 | Cole et al. |
| 2010/0198708 A1 | 8/2010 | Tabachnik |
| 2010/0299257 A1 | 11/2010 | Turk |
| 2011/0125615 A1 | 5/2011 | Shirbabadi et al. |
| 2011/0130867 A1 | 6/2011 | Matsumoto |
| 2011/0191243 A1 | 8/2011 | Allen |
| 2011/0196789 A1* | 8/2011 | Patton et al. ............... 705/43 |
| 2011/0231309 A1 | 9/2011 | Bohen et al. |
| 2011/0258090 A1 | 10/2011 | Bosch et al. |

(56) References Cited

U.S. PATENT DOCUMENTS

| | | |
|---|---|---|
| 2011/0316997 A1 | 12/2011 | Shirbabadi |
| 2012/0023017 A1 | 1/2012 | Votaw et al. |
| 2012/0065771 A1 | 3/2012 | Folk et al. |

FOREIGN PATENT DOCUMENTS

| | | |
|---|---|---|
| EP | 2372664 A1 | 5/2011 |
| JP | 08-002716 | 1/1996 |
| JP | 09-016691 | 1/1997 |
| JP | 10-188077 | 7/1998 |
| JP | 11-339099 | 12/1999 |
| JP | 2001-093019 | 4/2001 |
| JP | 2001-093022 | 4/2001 |
| JP | 2003-077029 | 3/2003 |
| JP | 2003-151001 | 5/2003 |
| JP | 3542051 | 7/2004 |
| JP | 2007227936 | 9/2007 |
| JP | 2009059294 A | 3/2009 |
| WO | WO 2005/038623 A3 | 4/2005 |
| WO | WO 2008/080101 A3 | 7/2008 |
| WO | WO 2010/004640 | 1/2010 |
| WO | WO 2010/039703 A2 | 4/2010 |

OTHER PUBLICATIONS gtnews.com, Glory Launches Online Currency Recycler for Retail Stores in Overseas Markets, www.gtnews.com/news.cfm?id=16176, Sep. 14, 2011.

* cited by examiner

RCM Recycler Transaction Types

| | Customer DDA | | In Process (Fed) account | | Device Balance DDA | | Device in Transit DDA | | Inventory (V) DDA | |
|---|---|---|---|---|---|---|---|---|---|---|
| | Best Buy Cleveland store 1 | | RCM In-Process | | RCM RECYCLER - CLEVELAND | | RCM RECYCLER IN-TRANSIT | | Brinks W Cleveland | |
| | D | C | D | C | D | C | D | C | D | C |
| Customer Transactions | | | | | | | | | | |
| Deposit of funds by customer | | | | | | | | | | |
| Day 1 | | 10,000.00 | 10,000.00 | | | | | | | |
| Day 2 | | | | 10,000.00 | 10,000.00 | | | | | |
| Withdrawal of funds by customer | | | | | | | | | | |
| Day 1 | 5,000.00 | | | 5,000.00 | | | | | | |
| Day 2 | | | 5,000.00 | | | 5,000.00 | | | | |
| Vendor Transactions | | | | | | | | | | |
| Empty - Cassette Pull by courier | | | | | | | | | | |
| Day 1 | | | | | | 4,000.00 | | | 4,000.00 | |
| Day 2 | | | | | | | | | | |
| Refill - Change order under dual control | | | | | | | | | | |
| Day 1 | | | | | | | 20,000.00 | | | 20,000.00 |
| Day 2 | | | | | 20,000.00 | | | 20,000.00 | | |

FIG. 21

RCM Recycler Transaction Types

| | Customer DDA | | In Process (Fed) account | | Device Balance DDA | | Device in Transit DDA | | Inventory (IV) DDA | | Adjustment DDA | |
|---|---|---|---|---|---|---|---|---|---|---|---|---|
| | Best Buy Cleveland store 1 | | RCM In-Process | | RCM RECYCLER - CLEVELAND | | RCM RECYCLER IN-TRANSIT | | Brinks IV Cleveland | | RCM Recycler Disputes | |
| | D | C | D | C | D | C | D | C | D | C | D | C |
| Customer Transactions | | | | | | | | | | | | |
| Deposit of funds by customer | | | | | | | | | | | | |
| Day 1 | | 10,000.00 | 10,000.00 | | | | | | | | | |
| Day 2 | | | | 10,000.00 | 10,000.00 | | | | | | | |
| Withdrawal of funds by customer | | | | | | | | | | | | |
| Day 1 | 5,000.00 | | | 5,000.00 | | | | | | | | |
| Day 2 | | | 5,000.00 | | | 5,000.00 | | | | | | |
| Vendor Transactions | | | | | | | | | | | | |
| Empty - Cassette Pull by courier | | | | | | | | | | | | |
| Day 1 | | | | | | 4,000.00 | 4,000.00 | | | | | |
| Day 2 | | | | | | | | 4,000.00 | 4,000.00 | | | |
| Refill - Change order under dual control | | | | | | | | | | | | |
| Day 1 | | | | | 20,000.00 | | | 20,000.00 | | | | |
| Day 2 | | | | | | | 20,000.00 | | | 20,000.00 | | |

FIG. 21 (Cont'd)

| | | | | | | | | | | | | | | | | | |
|---|---|---|---|---|---|---|---|---|---|---|---|---|---|---|---|---|---|
| | | | | | | | | | | | | | | | | 20.00 | |
| | | | | | | | | | | | | | | | | | 20.00 |
| | | | | | | | | | | | | | | | | | |
| | | | | | | | | | | | 60,000.00 | | | | | | |
| | | | | | | | | 50,000.00 | | | | | | | | | |
| | | | | | | 50,000.00 | | 50,000.00 | | | | | | | | | |
| | | | | | | | | | | 60,000.00 | | | | | | | |
| | | | 50,000.00 | | | | | | | | | 10.00 | | | | | |
| | | | | | 60,000.00 | | | | | | | | | 20.00 | 20.00 | | |
| | | | | | | | | | | | | | 10.00 | | | | |
| | | 10.00 | | | | | | | | | | | | | | | |
| 10.00 | | | | | | | | | | | | | | | | | |

Audit Transactions
*Audit Empty - removal of all funds by courier*
Day 1
Day 2

*Audit Fill - Replacement of via dual control*
Day 1
Day 2

Adjustments
*Unscheduled Verification Adjustment created when individual cassette is opened (Rejected Funds spit out the top unit)*
Day 1
Day 2

*Adjustment for balance differences created when device balance does not equal Vault Balance*
Day 1
OR Day 2

Note: Will be manually worked by Tom's Team

*FIG. 21 (Cont'd)*

RCM Recycler Fill/Empty Process

Empty:

| Customer DDA | Device Balance DDA* | Device in Transit DDA* | Inventory DDA* |
|---|---|---|---|
| D / C | D / C $10,000 | D $10,000 / C $10,000 | D $10,000 / C |

- Money is Removed from the device and is in movement to the vendor cash room (Device/FTPS initiated transaction)
- Money is Processed in the vendor cash room (Use of existing "D" record process in place with vendors)
- Reconciliation Detail record is received (Use of existing file received from vendors)

Fill:

| Customer DDA | Device Balance DDA* | Device in Transit DDA* | Inventory DDA* |
|---|---|---|---|
| D / C | D $25,000 / C | D $25,000 / C $25,000 | D / C $25,000 |

- Swap is initiated by an internal resource and money leaves 5/3 inventory (Use of existing "O" record process in place with vendors)
- Reconciliation Detail record is received (Use of existing file received from vendors)
- Money is put into the machine using the transaction type associated with a full swap (Device/FTPS initiated transaction)

FIG. 23

| Market | | | — Customer Transactions — | | | Vendor Transactions | | Frontier Balance | | |
|---|---|---|---|---|---|---|---|---|---|---|
| | Date | Recycler # | Previous Day Cash | Customer Deposits | Customer Withdrawls | Adjustments | Vendor Empty | Vendor Fill | Current Cash This Day (Calculat) | End of Day Cash Position | Difference |
| | 12/4/2010 | 11111 | 0 | 0 | 0 | $100.00 | 0 | 20000 | $20,100.00 | $20,100.00 | $0.00 |
| | 12/4/2010 | 22222 | 20000 | 7000 | 10000 | $0.00 | 0 | 0 | $17,000.00 | $17,000.00 | $0.00 |
| | 12/4/2010 | 33333 | 23000 | 5000 | 4000 | $0.00 | 0 | 0 | $24,000.00 | $24,000.00 | $0.00 |
| | 12/4/2010 | 44444 | 22000 | 10000 | 1000 | ($40.00) | 0 | 0 | $30,960.00 | $30,960.00 | $0.00 |
| | 12/4/2010 | 55555 | 13000 | 6000 | 2000 | $0.00 | 0 | 20000 | $33,000.00 | $34,000.00 | $1,000.00 |
| | 12/4/2010 | 66666 | 24560 | 8000 | 2500 | $0.00 | 4000 | 0 | $30,060.00 | $30,060.00 | $0.00 |
| | 12/4/2010 | 77777 | 19060 | 6000 | 7000 | $10.00 | 0 | 0 | $18,070.00 | $18,070.00 | $0.00 |

Lump Sum adjustment total on device level - these will go to a disputes DDA

Identification # = 15 digits

| Space | Vendor ID | Market ID | Serial # | Location |
|---|---|---|---|---|
| | 1 | 2-5 | 6-10 | 11-15 |

A  Market = identification code so each indiv. Recycler goes to correct Recycler DDA account (Space #2-5 of 15 identification #)
B  Date = Day 2 date for any transaction that occurs from cutoff day 1 to cutoff day 2
C  Recycler # = individual serial number for each device (Space #6-10 of 15 digit identification #)

FIG. 24

| | | |
|---|---|---|
| D | Previous Day Cash = prior days ending cash position (Column K from previous day) | |
| E | Deposit = Absolute total of all deposits for a device where deposit is defined as anytime a customer adds cash to device using Deposit function and login | |
| F | Withdrawal = Absolute total of all withdrawals for a device where a withdrawal is defined as anytime a customer takes cash out of device using Withdrawl function and login | |
| G | Adjustments = Net of all transactions caused when the device makes an adjustment to the cash balance after autoverification. In this case a cash removal is a negative amount. | |
| | These will post to our new Disputes DDA | |
| H | Empty = Absolute total of all Empty transactions for a device where an empty is defined as anytime the vendor removes cash out of device from the safe overflow cassette | |
| I | Fill = Absolute total of all Fill transactions for a device where a Fill is defined as anytime the vendor adds cash to device using the Fill function and login | |
| J | Current Cash (calculated) = D+E-F+G-H+I | |
| K | End of Day Cash Position = Balance of cash in the device at cutoff time per FTPS(7pm) | |
| L | Difference = Difference between column J and K | |
| | | |
| Requirements | | |
| | Device sends real time balance at the time the device feeds information over | |
| | | |
| FTPS Files | | |
| | 1. Need 2 files sent to Frontier daily: | |
| |    a. Balance File - represents Verified Cash Count (column K) - this needs to be a summary of all Recycler devices that flow through the DDA account. 1 balance for each DDA account | |
| |    b. Detail File - breaks down individual transactions for each recycler (example above) | |
| |       Each transaction item will have A,B,C, (lump sum E,F,G,H,I) and individual line item for column L | |
| | 2. Need detail file in .txt or excel format sent to Central Recon group daily | |
| | 3. FTPS will send Detail items to UDS as follows: | |
| |    lump sum total on device level - combine Deposits, W/D, Empty, Fills & Adjustments | |

*FIG. 24 (Cont'd)*

```
*** Manual Cash/Coin Deposit
***
Store: THE HOME DEPOT 0742
Machine Number: 000001027
Operator Name: CLIENT51
01/05/2012 09:45:48 AM
Eastern Standard Time
DDA Number: 7025229134
Location #: 742

Denom:      Count:
Value:
-------------------------------
[Total Manual Cash/Coin]
[Notes]
$100          1        100.00
$20           2         40.00
$1            6          6.00
[Coins]
25c           1          0.25
10c           1          0.10
5c            3          0.15
1c            3          0.03
-------------------------------
Total Declared Value   146.53

[Detail]
01/06 21:35   Register01
[Notes]
$1            5          5.00
[Coins]
5c            2          0.10
1c            1          0.01
-------------------------------
Total:                   5.11

01/06 21:43   Register08
[Notes]
$20           2         40.00
$1            1          1.00
[Coins]
1c            2          0.02
-------------------------------
Total:                  41.02

01/06 20:01   Register22
[Notes]
$100          1        100.00
-------------------------------
Total:                 100.00

01/06 19:35   Register01
[Coins]
25c           1          0.25
10c           1          0.10
5c            1          0.05
-------------------------------
Total:                   0.40

----------<GRSX    >----------
```

- The "Manual Cash and Coin DDA" in Account Number Setting will be printed.
- The "Serial Number (C)" in Server Setting will be printed. Any leading zeros will be eliminated.

Fig. 32

```
****    Manual Check Deposit
****
Store: THE HOME DEPOT 0742
Machine Number: 000001027
Operator Name: CLIENT01
01/05/2012 08:45:48 AM
Eastern Standard Time
DDA Number: 70262491 24
Location = 742

Denom:       Count:
Value:
---------------------------
[Total Manual Check]
Total Declared Value:
             7         888.43

[Detail]
01/06 22:43 Register05
1   Check        1
88.50
---------------------------
Total:       1         88.50

01/06 21:50 Register20
1   Check        1
20.20
2   Check        1
123.50
3   Check        1
200.25
---------------------------
Total:       3         343.95

01/06 20:35 Register11
1   Check        1
100.01
2   Check        1
80.77
---------------------------
Total:       2         180.78

01/06 16:50 Register09
1   Check        1
55.20
---------------------------
Total:       1         55.20
----------<GRSX    >----------
```

The "Manual Check DDA" in Account Number Setting will be printed.

The "Serial Number (C)" in Server Setting will be printed.
Any leading zeros will be eliminated.

Fig. 33

CURRENCY RECYCLER

RELATED APPLICATIONS

This application claims the benefit of U.S. Provisional Application Ser. No. 61/535,098 filed Sep. 15, 2011, the disclosure of which is hereby incorporated by reference in its entirety.

FIELD OF THE INVENTION

The present invention relates generally to a currency recycler; and more particularly to a system and method for securely storing and distributing currency.

BACKGROUND AND SUMMARY OF THE INVENTION

In many retail establishments, currency security is often an important issue. As the threat of currency theft is often high in retail establishments, many such retail establishments utilize a safe or other device to store large amounts of currency. In order to ensure security of the currency, employees of the retail establishment often do not have access to the deposited currency. By placing currency and other valuables into the safe, oftentimes, the deposited currency is removed from circulation until a bank or other financial institution is able to retrieve the currency out of the safe. However, removing the currency from circulation may put short term financial strain on the retail establishment.

Embodiments disclosed herein include a currency recycler that is designed to provide retail establishments with faster availability to their daily cash receivables. By leveraging equipment and data processing to deliver deposit data to the financial institution in an expeditious manner, the retail establishment can gain fast access to deposits. In addition, embodiments of the currency recycler provide counting capabilities that automate the handling of the banknotes. Further, by reducing the amount of touches of the banknotes, reductions in loss funds can be realized.

The point of entry is through the currency recycler, which accurately identifies the banknote value and stores the banknote in either a location where it can be retrieved (recycled) or in a location that is used for storage until retrieved by an armored car provider. Embodiments of the currency recycler are connected to a network that allows for communication of the transaction (deposit/withdrawal) to temporary files that keeps track of the net of the deposits/withdrawals. At the end of the processing day, by accumulating the data to match the retailer establishment's point of sale systems, embodiments disclosed herein are able to provide an output that allows for reconciliation to be automated at the corporate back office.

Thus, embodiments disclosed herein connect the currency recycler to a network that allows for communication at all times. This allows retail establishments to have multiple stores working collectively from one pending balance. By allowing the retail establishments to work from one balance, this removes the need for excess availability to be required within each store thus allowing for the retail to gain access to working capital.

According to one embodiment, the disclosure provides a computer system for processing financial transactions of a retailer having a plurality of retailer locations including a first retailer location with first currency recycler and a second retailer location with a second currency recycler. The at least one processor, a network interface, and a memory element are coupled to the processor. On the memory are stored instructions to direct the processor to perform operations. For example, the processor may be programmed to store a first recycler identifier indicative of a first recycler unit, a second recycler identifier indicative of a second recycler unit, and a retailer identifier indicative of a retail store using the first recycler unit and the second recycler unit. A first recycler account balance may be associated with the first recycler identifier; a second recycler account balance may be associated with the second recycler identifier; and a retailer account balance may be associated with the retailer identifier. Typically, a first location identifier indicative of a store location at which the first recycler unit is being used is associated with the retailer identifier and a second location identifier indicative of a store location at which the second recycler unit is being used with the retailer identifier. In some embodiments, the transaction request includes the retailer identifier and either the first location identifier or the second location identifier. The retailer account balance is adjusted regardless of whether the transaction request includes the first location identifier or the second location identifier.

According to another embodiment, the disclosure provides a system for processing financial transactions. For example, the system may include a first currency recycler at a first location, a second currency recycler at a second location and a remote computing device configured to communicate with the first currency recycler and the second currency recycler via a communications network. The remote computing device includes a processor programmed to perform a plurality of operations. For example, a first recycler identifier indicative of the first recycler unit, a second recycler identifier indicative of the second recycler unit, and a retailer identifier indicative of a retail store using the first recycler unit and the second recycler unit may be stored. The processor may associate a first recycler account balance with the first recycler identifier, a second recycler account balance with the second recycler identifier, and a retailer account balance with the retailer identifier. The retailer account balance is adjusted responsive to transaction requests by both the first currency recycler and the second currency recycler. In some embodiments, the first currency recycler sends a transaction request to the remote computing device responsive to a user selecting a transaction on the first currency recycler and the transaction request includes the retailer identifier and the first currency recycler identifier. The remote computing device is configured to adjust the retailer account balance in response to receiving a transaction request from the first currency recycler. When the second currency recycler sends a transaction request to the remote computing device responsive to a user selecting a transaction on the second currency recycler, the transaction request includes the retailer identifier and the second currency recycler identifier. The remote computing device is configured to adjust the retailer account balance in response to receiving a transaction request from the second currency recycler.

According to yet another embodiment, the disclosure provides a currency recycler with a processor, a plurality of stackers configured to hold currency, a currency routing assembly, a display, an input device configured to select one or more options presented on the display, a network interface, and a memory element coupled to the processor. The memory has instructions stored thereon to direct the processor to perform certain operations. For example, the processor may be programmed to present a plurality of transaction types for selection by the user on the display. Typically, the transaction types include an exchange transaction and/or a manual processing transaction. If the user selects the exchange transaction using the input device, this will initiate a withdrawal transaction by which a selected withdrawal amount is dispensed through the exit. After the selected withdrawal amount is dispensed, a deposit transaction is processed for a deposit amount equal to the selected withdrawal amount. In some cases, the user is provided an opportunity to select another denomination of bills if an initial selection is unavailable.

Embodiments are contemplated for a non-transitory, computer readable storage medium storing a program for performing an exchange transaction on a currency recycler according to a process that includes the step of presenting a plurality of transaction types for selection by the user on a display, including an exchange transaction. If the user selects an exchange transaction, the program will prompt for selection of a withdrawal amount and a preferred denomination. A determination is made as to whether the preferred denomination is available. If so, the preferred denomination is dispensed to the user and a deposit transaction is processed. If not, the user is prompted for the selection of another denomination; once an available selection is made, that denomination is dispensed to the user and a deposit transaction is processed.

Additional features and advantages of the subject system and method will become apparent to those skilled in the art upon consideration of the following detailed materials which form part of this provisional application.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 21 depicts a diagram illustrating transaction types for the currency recycler, according to one or more embodiments shown and described herein;

FIG. 23 depicts a diagram illustrating a fill/empty process for the currency recycler, according to one or more embodiments shown and described herein;

FIG. 24 depicts a diagram illustrating customer transactions with the currency recycler, according to one or more embodiments shown and described herein;

FIGS. 32 and 33 depict example receipts illustrating an example of manual processing for coin and/or checks according to one or more embodiments shown and described herein.

DETAILED DESCRIPTION OF THE DRAWINGS

Figure 1:
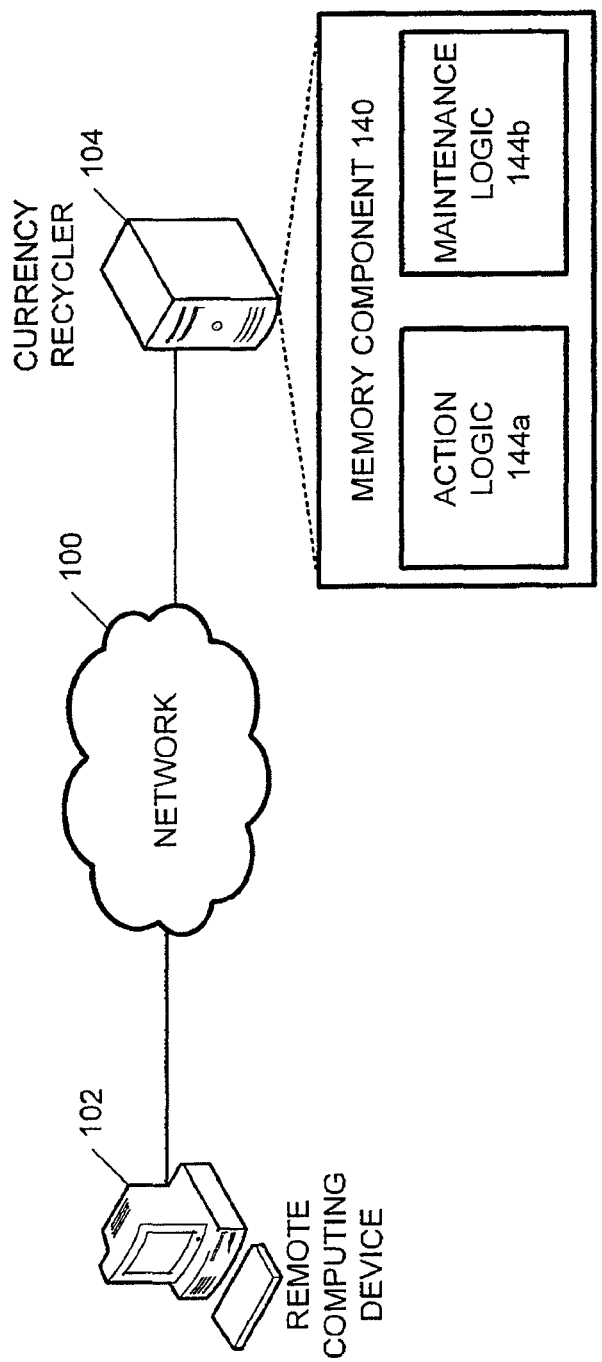
FIG. 1 depicts a computing environment for a currency recycler, according to one or more embodiments shown and described herein.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

In general, embodiments disclosed herein relate to a commercial system/process that recycles currency. As an example, one or more currency recyclers may be located at one or more respective retailer locations. The currency recyclers may each be linked to a financial account that the retailer has with the financial institution. The currency recycler may provide a mechanism for receiving monetary deposits from the retailer at one of the currency recyclers into the account. The currency recycler may also authenticate the deposit transactions and provide a preliminary indication that the deposits have been accepted. At the end of the day, all transactions may be subject to a secondary verification before being finalized. This final verification may include sending the transactions to the financial institution for settlement processing. The settlement of transactions may occur every day of the week rather than only on weekdays as done on existing systems. Verification could be provided to a courier that restocks the currency recycler; and/or providing verification by the currency recycler itself. Regardless, upon deposit of the currency into the currency recycler (and pending final approval), the currency belongs to the financial institution; with the retailer's account being credited.

Similarly, if a retailer wishes to make a withdrawal from their account for use in the retail location, they can use the currency recycler as they would use an automated teller machine (ATM). Once the retailer is authenticated, the currency recycler can preliminarily debit that retailer's account and provide the requested currency. Again, at a predetermined time (such as the end of the day), the currency recycler can provide a final verification for all transactions.

As such, the currency recycler is configured to document an accounting of the deposits and withdrawals. The deposited currency may be stored in a common reservoir with currency that was provided by the financial institution for withdrawals. This allows deposited currency to be "recycled" for withdrawals. By recycling the currency, the currency recycler can operate without needing a courier to insert/remove currency on a regular basis. Instead, because the currency recycler is maintained and monitored by the financial institution, the technician can wait until the currency recycler indicates that the currency level reaches a predetermined low threshold or predetermined high threshold. Upon receiving the indication, the technician can add additional currency and/or remove excess currency from the currency recycler. Additionally, as the deposited currency belongs to the financial institution, FDIC balance minimums may be more easily met by the financial institution, and the retailer reduces their risk involving theft of deposited funds.

Referring now to the drawings, FIG. 1 depicts a computing environment for a currency recycler, according to one or more embodiments shown and described herein. As illustrated, a network 100 may be coupled to a remote computing device 102 and an a currency recycler 104. The network 100 may include a wide area network and/or a local area network and thus may be wired and/or wireless. The remote computing device 102 may include any portable and/or non-portable computing device, such as personal computer, laptop computer, tablet computer, personal digital assistant (PDA), mobile phone, etc. The remote computing device 102 may additionally include other communication infrastructure, such as infrared, Wi-Fi™, near field communication to function as a remote control of one or more of the devices depicted in FIG. 1.

The currency recycler 104 may be located in a retail environment and may be coupled to the network 100 via a wired and/or wireless connection. The action logic 144a may include software, hardware (such as a programmable logic controller), and/or firmware for providing operational commands to one or more of the service devices 110. Similarly, the maintenance logic 144b may include software, hardware, and/or firmware for facilitating maintenance of the currency recycler 104.

It should be understood that while the remote computing device 102 and the currency recycler 104 are represented in FIG. 1 each as a single component; this is merely an example. In some embodiments, there may be numerous different components that provide the described functionality. However, for illustration purposes, single components are shown in FIG. 1 and described herein.

It should also be understood that while FIG. 1 depicts each of the remote computing device 102 and the currency recycler 104 as being physically coupled to the network 100, this is also merely an example. More specifically, the embodiment of FIG. 1 is depicted to illustrate a communicative connection between devices. This communicative connection may take the form of a wired connection and/or a wireless connection. Thus, depending on the particular embodiment, a physical connection may or may not actually be implemented. On a similar note, the wireless connection may take any of a number of different forms, including a near field communication protocol (such as Bluetooth™, RF4CE, etc.), a mid-range wireless protocol (such as Wi-Fi™, Wi-Di™, etc.), and/or a long range wireless protocol (such as WiMax, 3G, 4G, etc.).

Figure 2:
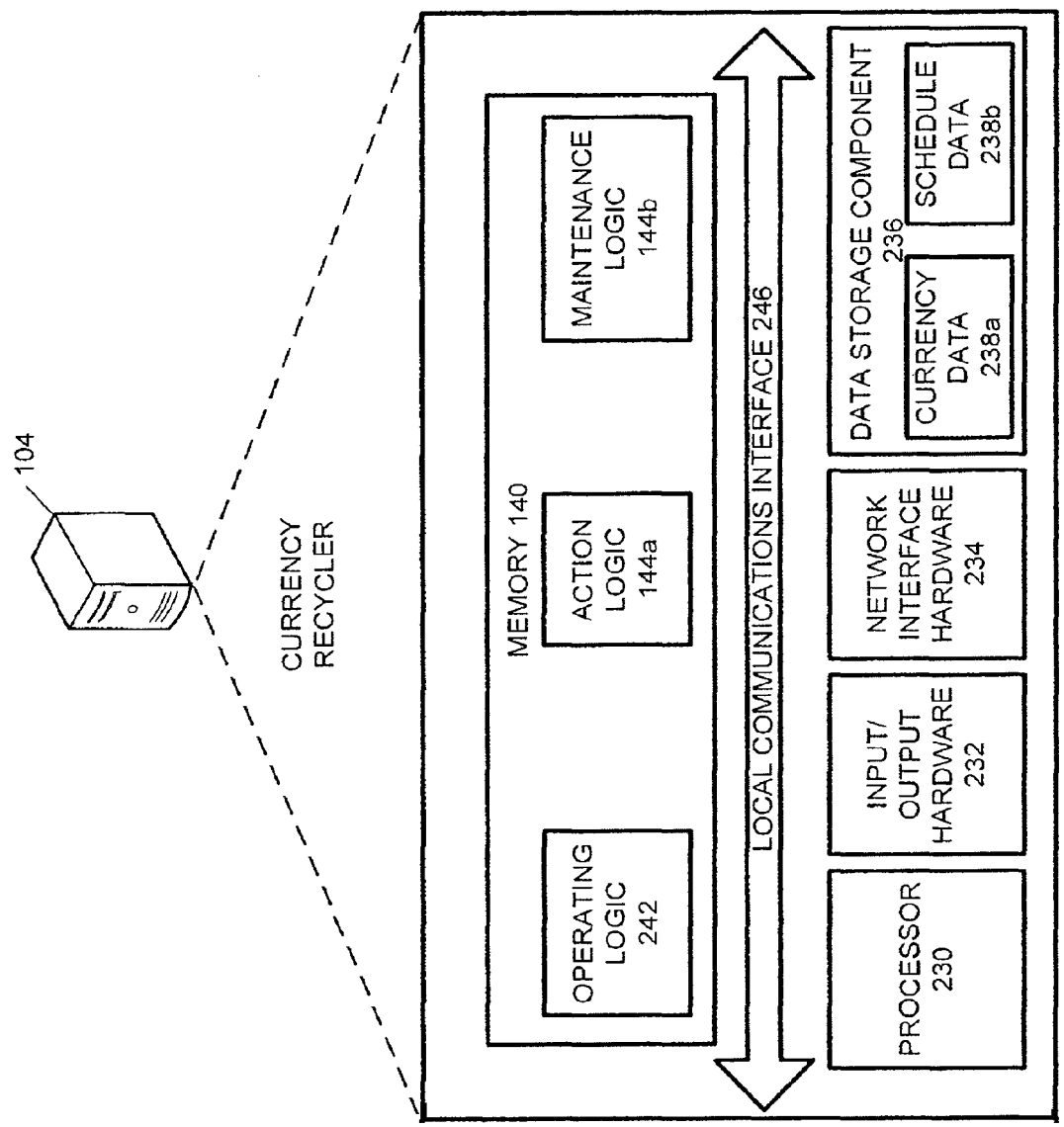
FIG. 2 depicts computing components in a currency recycler, according to one or more embodiments shown and described herein.

FIG. 2 depicts computing components in the currency recycler 104, according to one or more embodiments shown and described herein. In the illustrated embodiment, the currency recycler 104 includes a processor 230, input/output hardware 232, network interface hardware 234, a data storage component 236 (which stores currency data 238a, schedule data 238b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, the non-transitory computer-readable medium may reside within the currency recycler 104 and/or external to the currency recycler 104.

Additionally, the memory component 140 may store operating logic 242, the action logic 144a, and the maintenance logic 144b. The action logic 144a and the maintenance logic 144b may each include a plurality of different pieces of logic, each of which may be embodied as a computer program, firmware, and/or hardware, as an example. A local communication interface 246 is also included in FIG. 2 and may be implemented as a bus or other communication interface to facilitate communication among the components of the currency recycler 104.

The processor 230 may include any processing component operable to receive and execute instructions (such as from the data storage component 236 and/or the memory component 140). The processor may be located outside the housing for security reasons or other reasons. For example, the processor may be located in a safe area typically below the recycler. Optionally, the processor may be located remote from the recycler and/or safe and may be connected wirelessly to the recycler and/or safe. The input/output hardware 232 may include and/or be configured to interface with a monitor, positioning system, keyboard, touch screen, mouse, printer, image capture device, microphone, speaker, gyroscope, compass, and/or other device for receiving, sending, and/or presenting data. The network interface hardware 234 may include and/or be configured for communicating with any wired or wireless networking hardware, including an antenna, a modem, LAN port, wireless fidelity (Wi-Fi) card, Bluetooth™ hardware, WiMax card, mobile communications hardware, and/or other hardware for communicating with other networks and/or devices. From this connection, communication may be facilitated between the currency recycler 104 and other computing devices.

The operating logic 242 may include an operating system and/or other software for managing components of the currency recycler 104. Similarly, as discussed above, the action logic 144a may reside in the memory component 140 and may be configured to cause the processor 230 to control and/or manage one or more of the service devices 110. Similarly, maintenance logic 144b may be configured for facilitating the replacement of one or more parts of the service devices 110. Other functionality is also included and described in more detail, below.

It should be understood that the components illustrated in FIG. 2 are merely exemplary and are not intended to limit the scope of this disclosure. More specifically, while FIG. 2 illustrates a personal computer architecture, other architectures, such as a programmable logic control (PLC) may be utilized for implementing the desired functionality. Additionally, while the components in FIG. 2 are illustrated as residing within the currency recycler 104, this is also merely an example. In some embodiments, one or more of the components may reside external to the currency recycler 104. It should also be understood that while the currency recycler 104 in FIG. 2 is illustrated as a single device, this is also merely an example. In some embodiments, the action logic 144a and/or the maintenance logic 144b may reside on different devices. Further, while the currency recycler 104 is illustrated with the action logic 144a and the maintenance logic 144b as separate logical components, this is also an example. In some embodiments, a single piece of logic may cause the currency recycler 104 to provide the described functionality.

Figure 3:
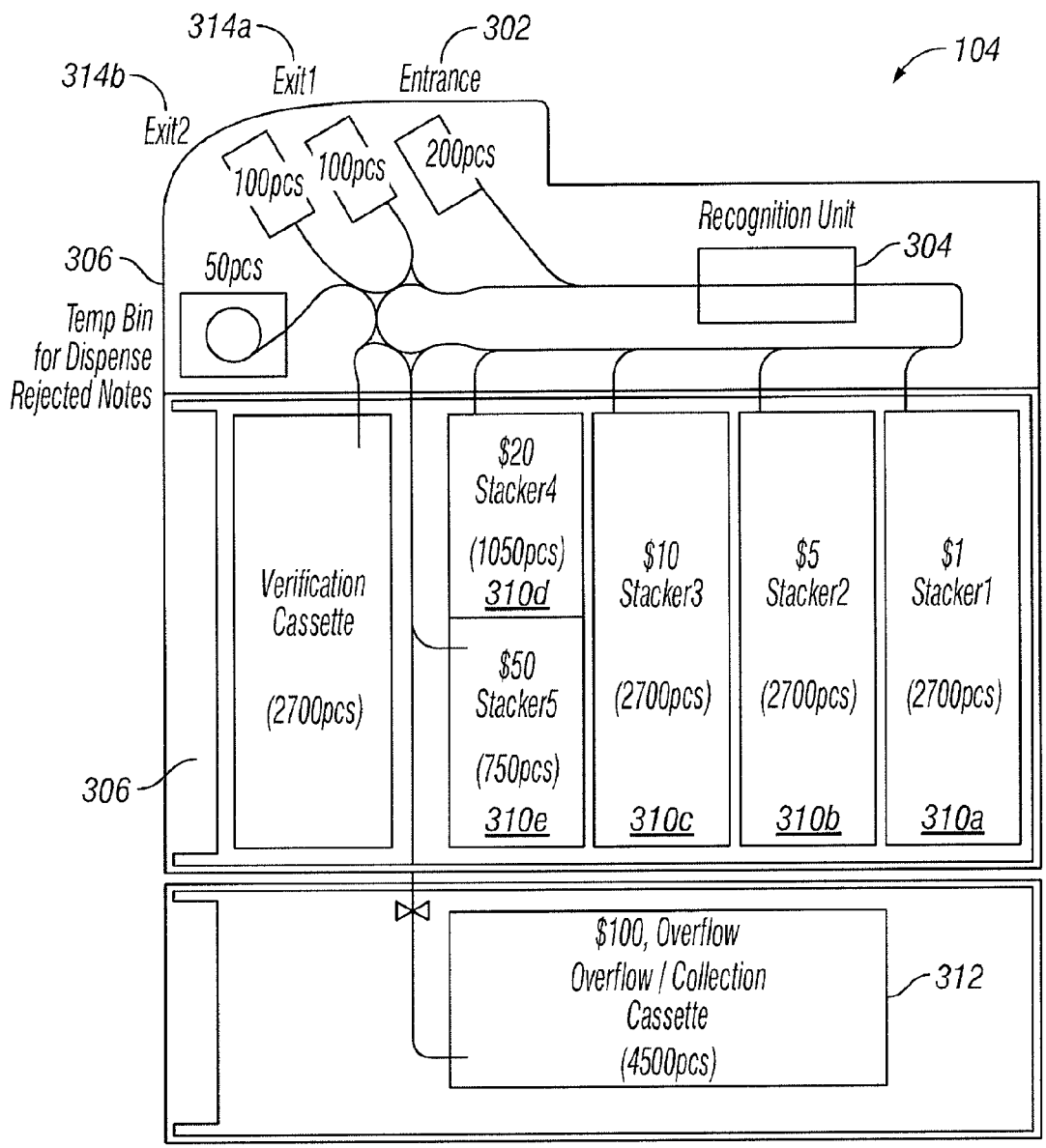
FIG. 3 depicts hardware components of a currency recycler, according to one or more embodiments shown and described herein.

FIG. 3 depicts hardware components of a currency recycler 104, according to one or more embodiments shown and described herein. In the embodiment shown, a currency recycler 104 is depicted and may include an entrance 302, a recognition unit 304, temporary bin for dispensing rejected notes 306, a verification cassette 308, a $1 stacker 310a, a $5 stacker 310b, a $10 stacker 310c, a $20 stacker 310d, a $50 stacker 310e, a $100 stacker/overflow cassette 312, a first exit 314a, and a second exit 314b.

Figure 4:
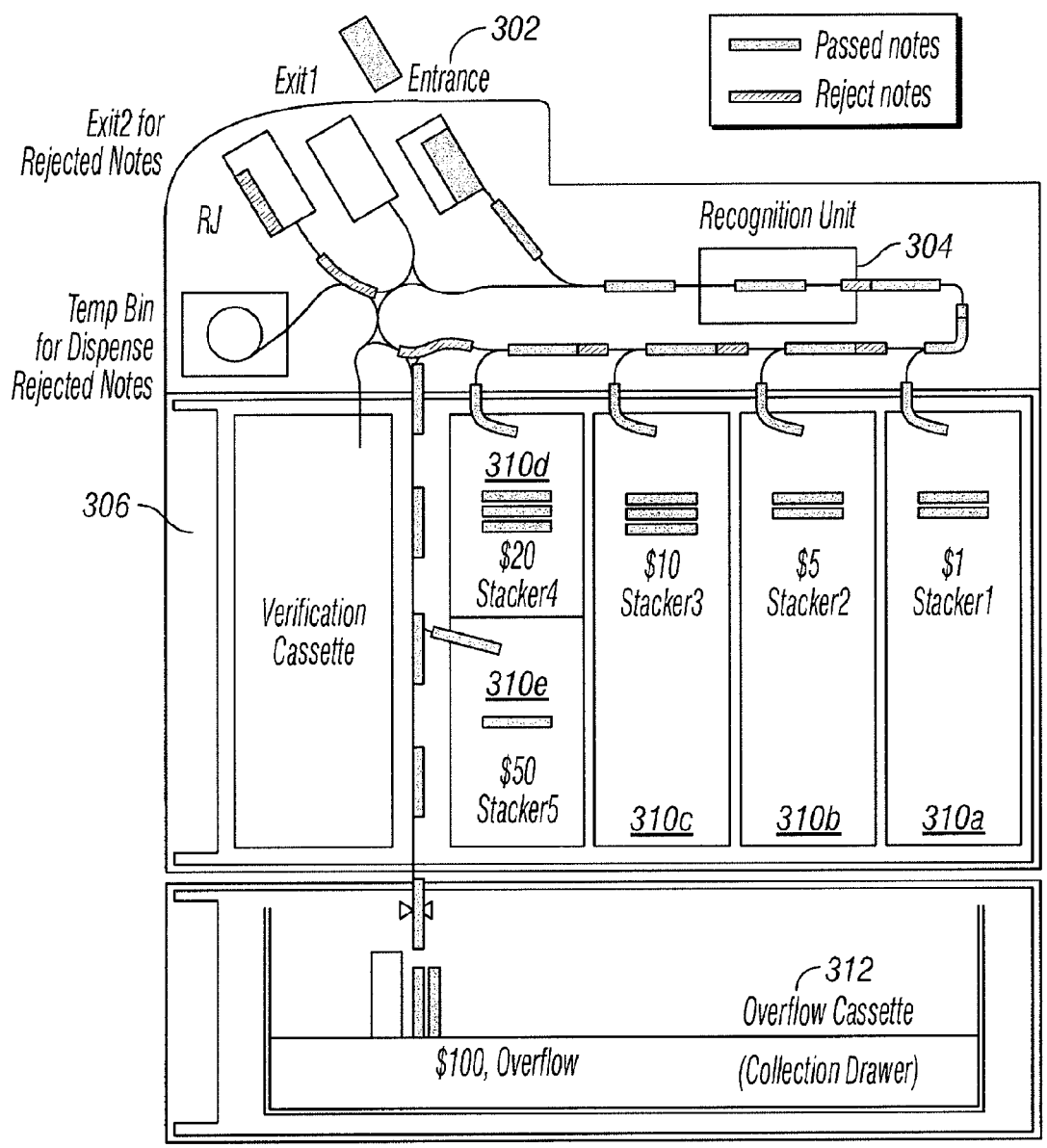
FIG. 4 depicts the hardware components of the currency recycler during a deposit, according to one or more embodiments shown and described herein.

FIG. 4 depicts the hardware components of the currency recycler 104 during a deposit, according to one or more embodiments shown and described herein. More specifically, currency may be placed in the entrance 302 and then sent to the recognition unit 304 for verification that the currency is valid. If the currency is not valid, it may be sent to the temporary bin for dispensing rejected notes 306 and then to the exits 314a, 314b. If the recognition unit 304 verifies the received currency, it may be placed into one of the stackers 310, the overflow cassette 312, and/or the verification cassette 308.

Figure 5:
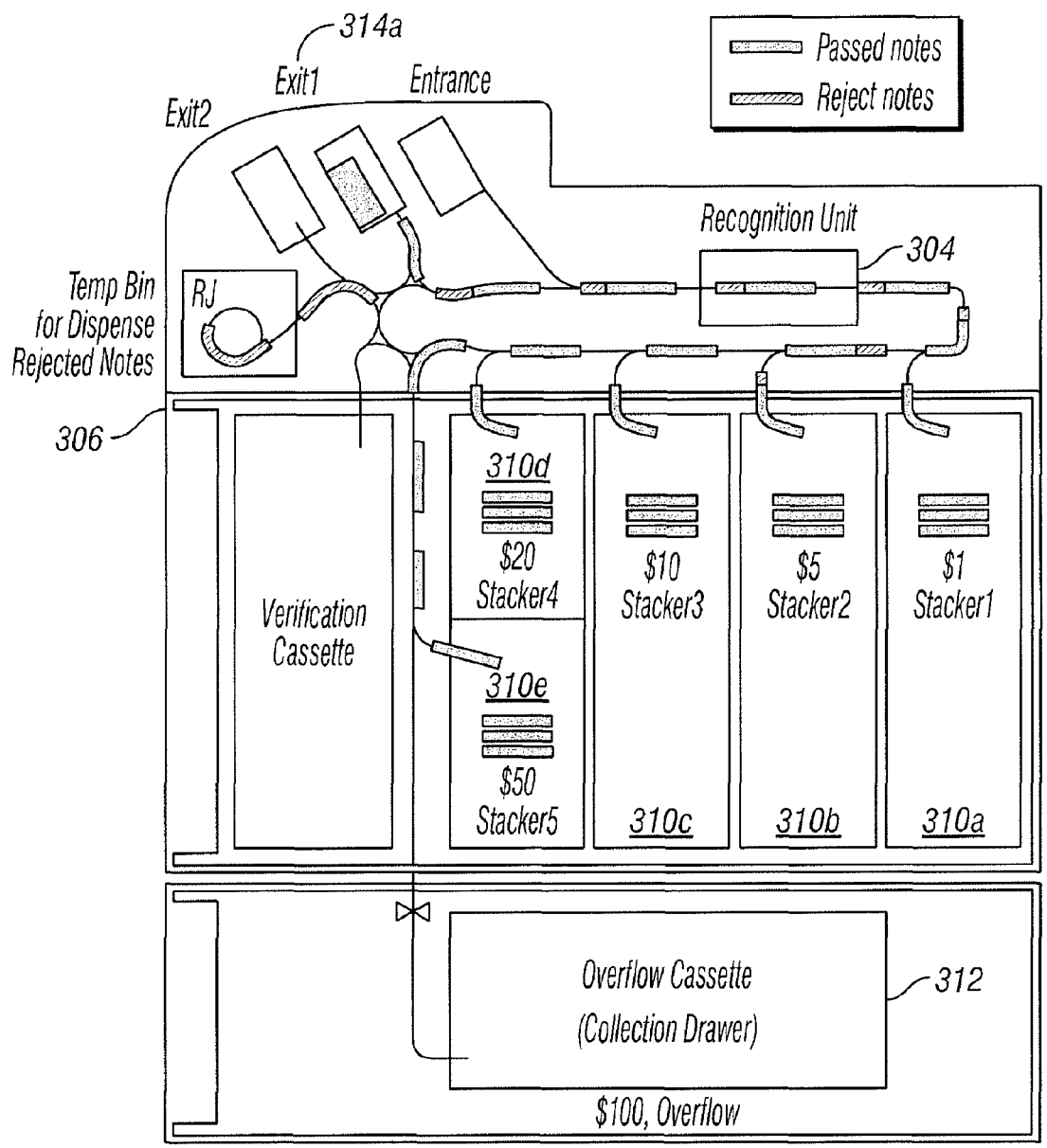
FIG. 5 depicts the hardware components of the currency recycler during a withdrawal, according to one or more embodiments shown and described herein.

FIG. 5 depicts the hardware components of the currency recycler 104 during a withdrawal, according to one or more embodiments shown and described herein. As illustrated, if withdrawal is desired, the requested amount may be pulled from the stackers 310a, into the recognition unit 304. If the recognition unit 304 passes the currency, the currency may be sent to the first exit 314a. If the recognition unit 304 rejects the currency, the currency may be sent to the temporary bin for dispensing rejected notes 306 for later retrieval.

Figure 6:
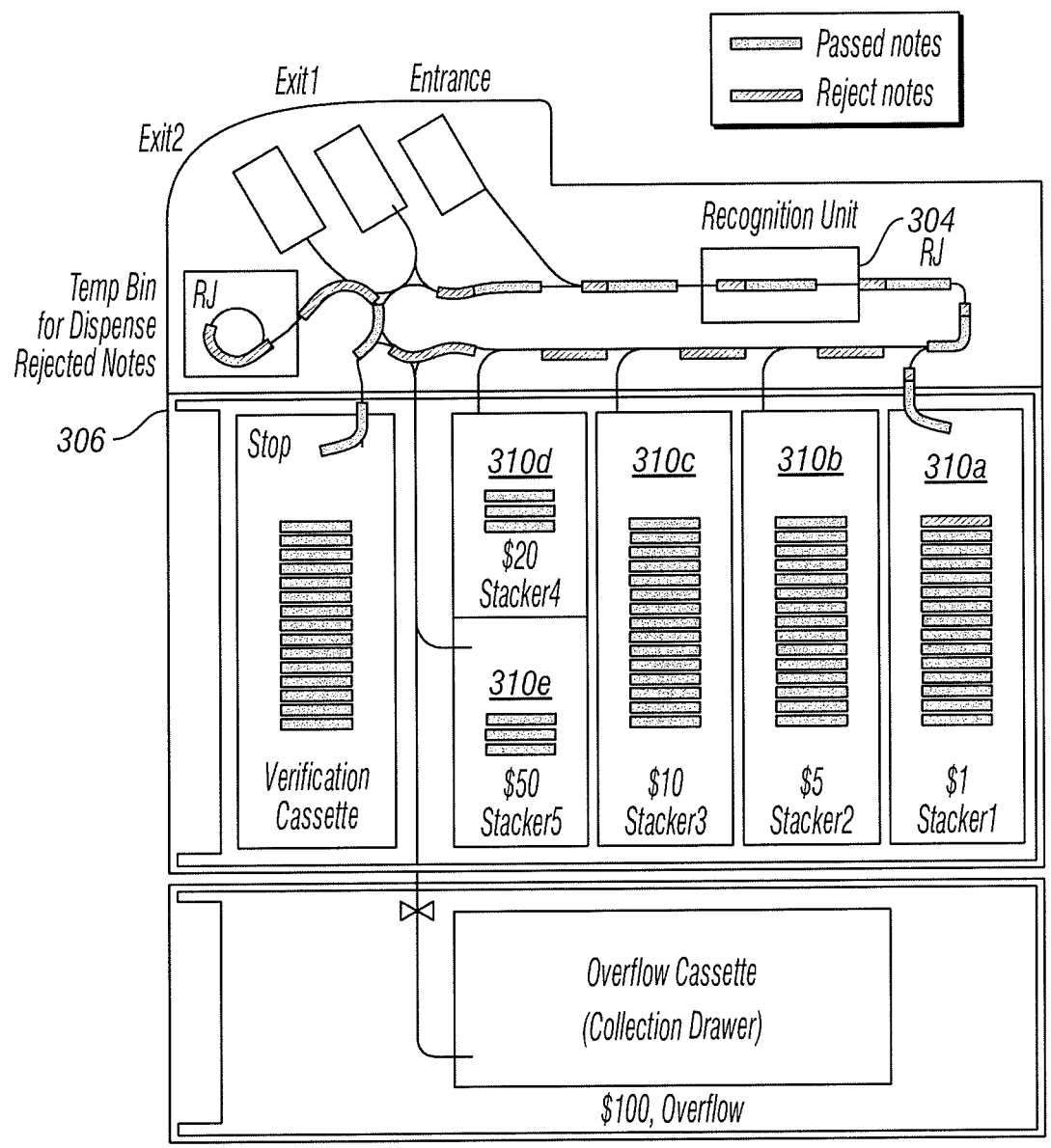
FIG. 6 depicts the hardware components of the currency recycler during a long auto-verification, according to one or more embodiments shown and described herein.

FIG. 6 depicts the hardware components of the currency recycler 104 during a long auto-verification, according to one or more embodiments shown and described herein. As illustrated, currency may be retrieved from a stacker 310a, which may include a rejected note. The currency may then be sent to the recognition unit 304 for verification. The rejected currency is sent to the temporary bin for dispensing rejected notes 306, while the valid notes are sent to the verification cassette 308.

Figure 7:
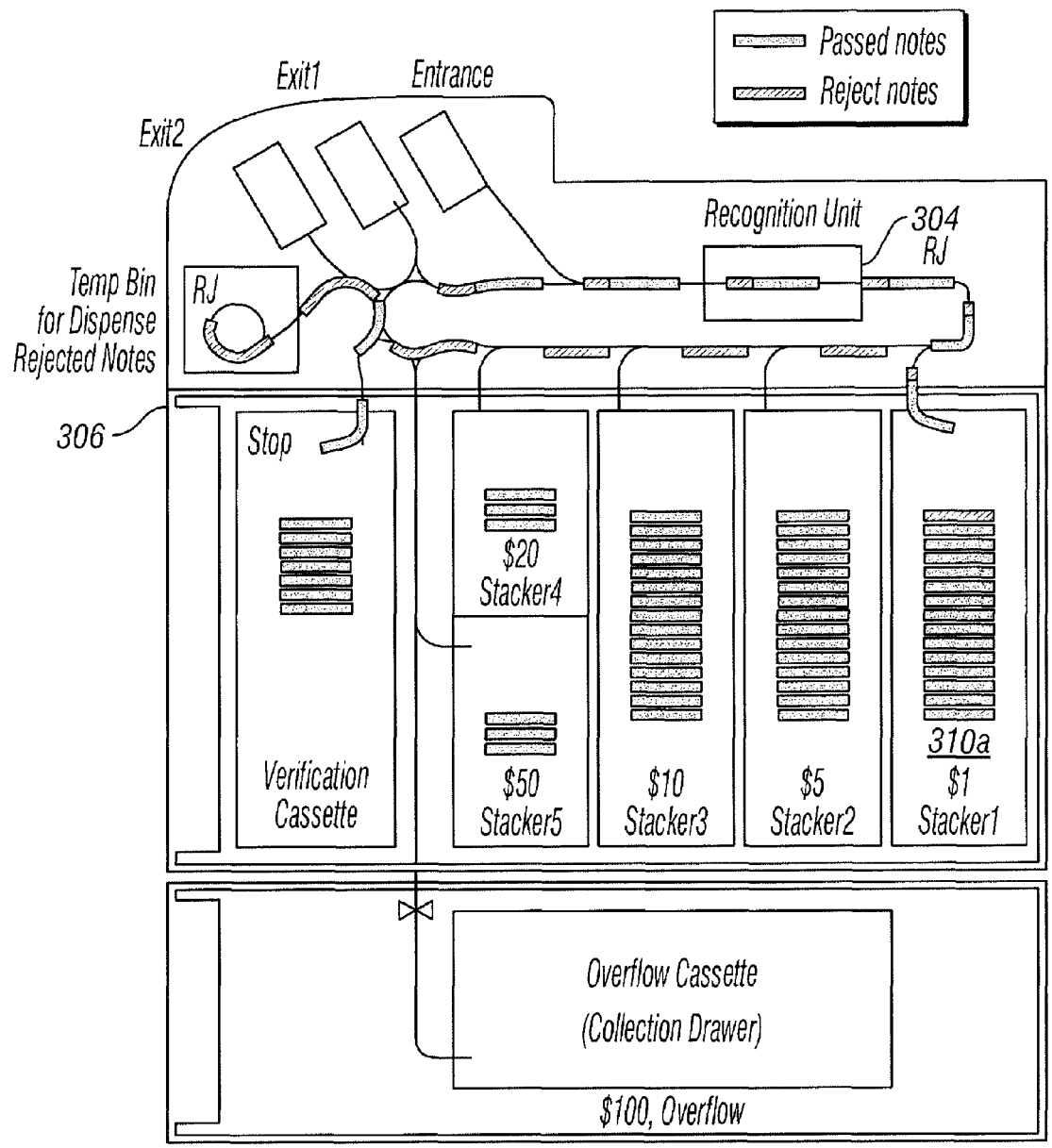
FIG. 7 depicts the hardware components of the currency recycler during a short auto-verification, according to one or more embodiments shown and described herein.

FIG. 7 depicts the hardware components of the currency recycler 104 during a short auto-verification, according to one or more embodiments shown and described herein. Similar to the embodiment of FIG. 6, currency may be retrieved from a stacker 310, which may include a rejected note. The currency may then be sent to the recognition unit 304 for verification. The rejected currency is sent to the temporary bin for dispensing rejected notes 306, while the valid currency is sent to the verification cassette 308.

Figure 8:
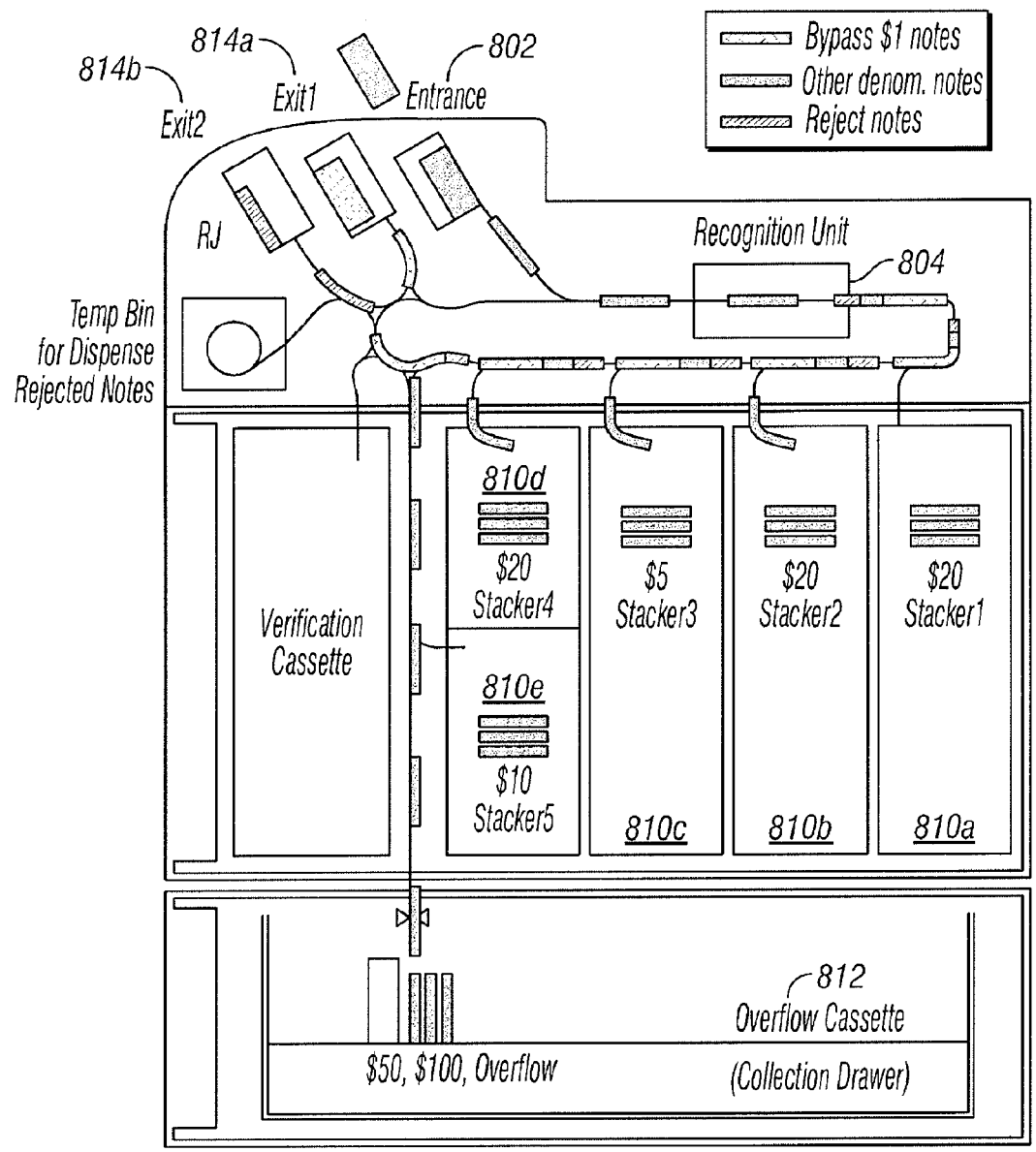
FIG. 8 depicts the hardware components of the currency recycler during a bypass deposit, according to one or more embodiments shown and described herein.

FIG. 8 depicts the hardware components of the currency recycler 104 during a bypass deposit, according to one or more embodiments shown and described herein. In some embodiments, $1 currency may not be available for deposit. As such, currency may be received at the entrance 802 and sent to the recognition unit 804 for verification. The verification may include determining whether the currency is a valid note, an invalid note, and/or a $1 note. If the currency is a valid note, it may be sent to the stackers 810a-810e and/or to the overflow cassette 812. If the currency is an invalid note, it may be sent to the second exit 814b. If however, the currency is a $1 note, it may be sent to the first exit 814a.

Figure 9:
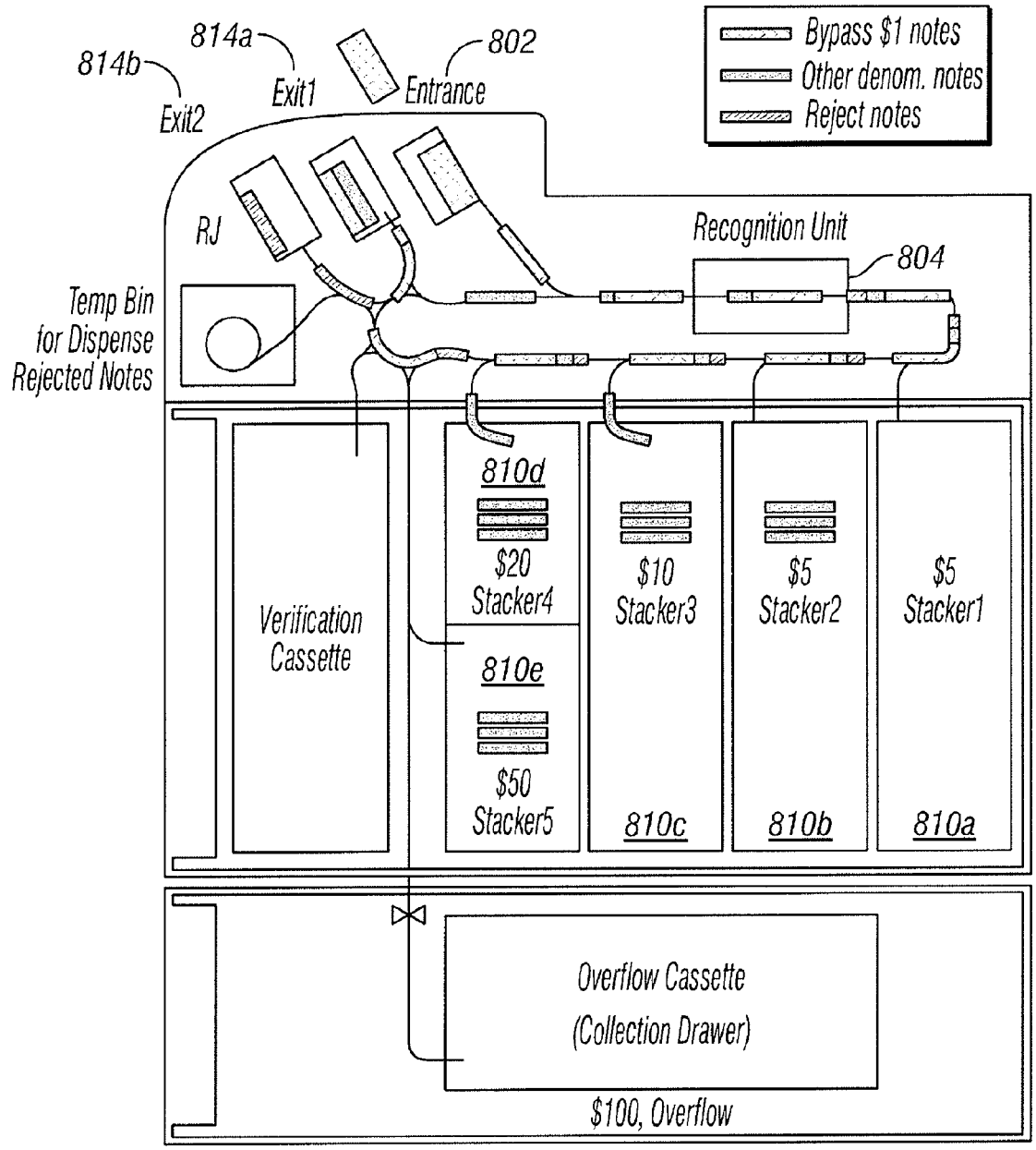
FIG. 9 depicts the hardware components of the currency recycler during a bypass withdraw, according to one or more embodiments shown and described herein.

FIG. 9 depicts the hardware components of the currency recycler 104 during a bypass withdraw, according to one or more embodiments shown and described herein. As discussed above, when currency is received at the entrance 802, it may be sent to the recognition unit 804 for verification of validity and/or whether the currency is a $1 note. The rejected notes may be sent to the second exit 814b and the $1 notes may be sent to the first exit 814a. Additionally, upon withdrawal, valid currency may be retrieved from the stackers 810 and sent to the first exit 814a.

Figure 10:
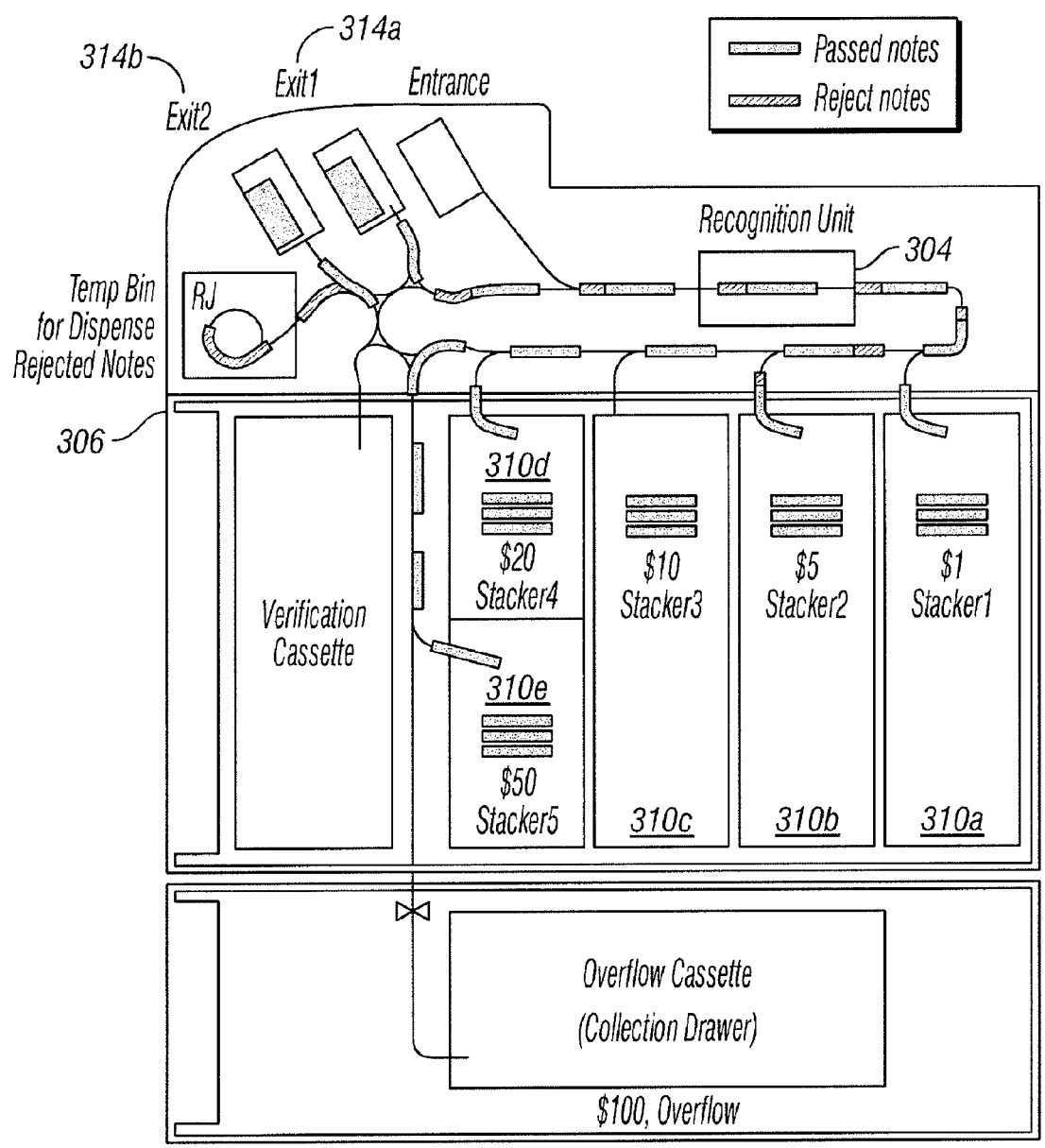
FIG. 10 depicts the hardware components of the currency recycler during repeat withdraw, according to one or more embodiments shown and described herein.

FIG. 10 depicts the hardware components of the currency recycler 104 during repeat withdraw, according to one or more embodiments shown and described herein. As illustrated, if a repeat withdrawal is requested, currency may be retrieved from the stackers 310 and sent through the recognition unit 304. Rejected notes may be sent to the temporary bin for dispensing rejected notes 306, while the passed notes may be sent to the exits 314a, 314b.

Figure 11:
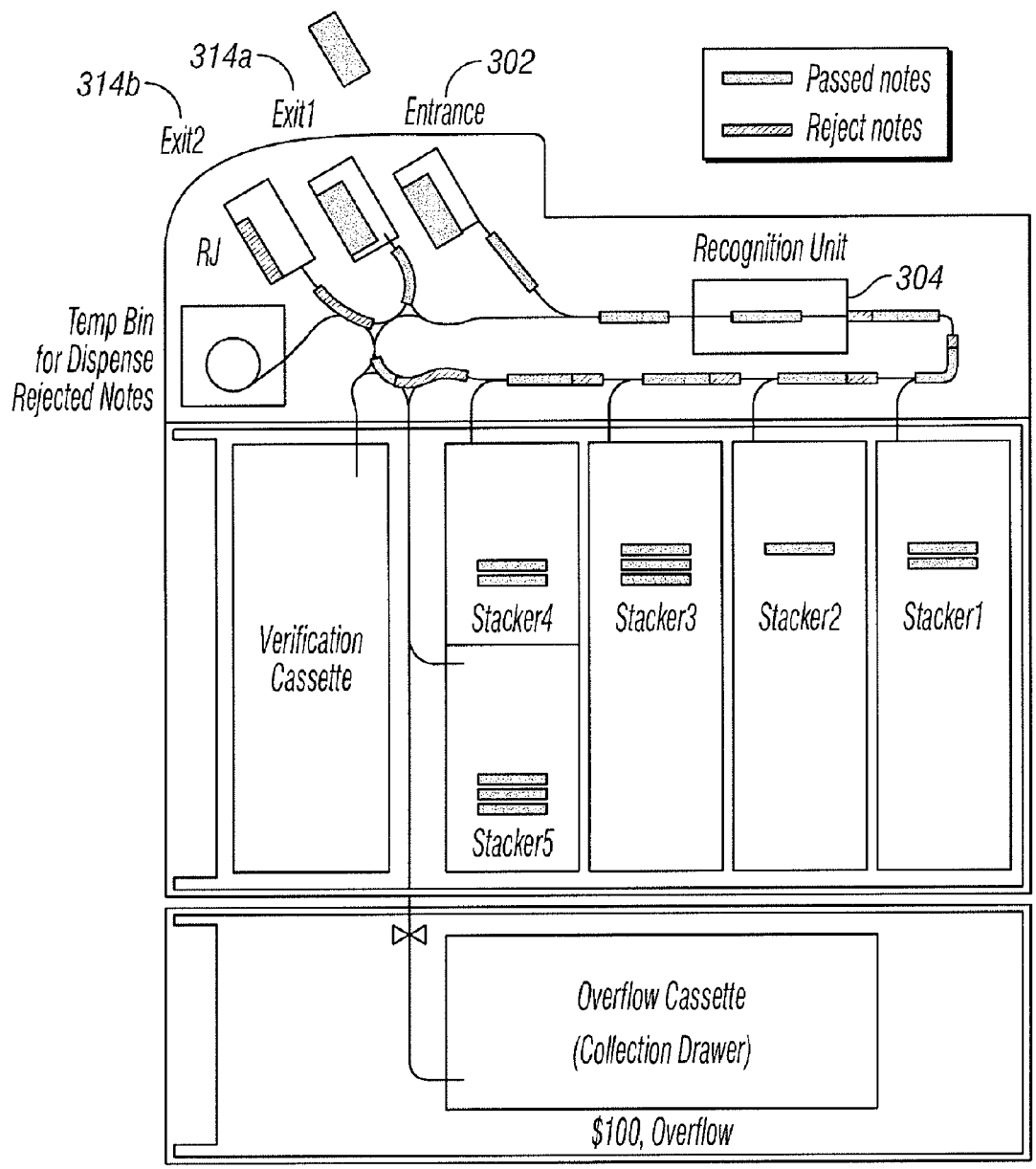
FIG. 11 depicts the hardware components of the currency recycler during a count, according to one or more embodiments shown and described herein.

FIG. 11 depicts the hardware components of the currency recycler 104 during a count, according to one or more embodiments shown and described herein. As illustrated, if a user inserts currency into the currency recycler 104 for counting, the currency may be received at the entrance 302. The currency may then be sent to the recognition, which may verify whether the currency is valid. If the currency is valid, the value of that currency may be counted and output to the user. The valid currency may be returned to the user at the first exit 314a. If the recognition unit 304 determines that at least one of the notes is invalid, the invalid currency may be rejected and sent to the second exit 314b.

Figure 12:
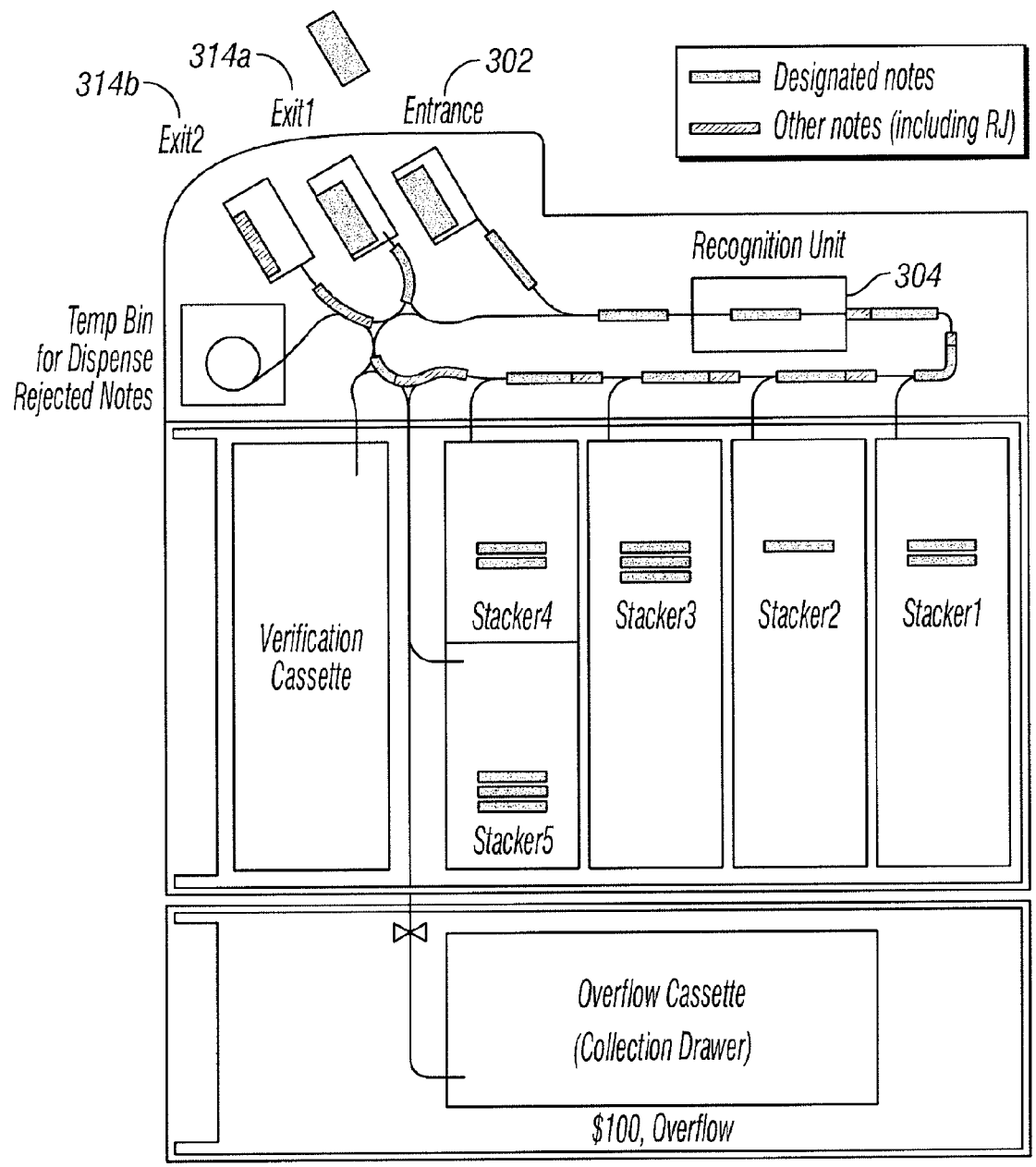
FIG. 12 depicts the hardware components of the currency recycler during a sort notes procedure, according to one or more embodiments shown and described herein.

FIG. 12 depicts the hardware components of the currency recycler 104 during a sort notes procedure, according to one or more embodiments shown and described herein. As illustrated, if the user desires currency to be sorted, the user may insert the currency into the entrance 302. The currency may then be sent to the recognition unit 304 for verification and sorting. The invalid notes may be removed from the currency and sent to the second exit 314b. The remaining valid notes may be sorted and returned to the user via the first exit 314a.

Figure 13:
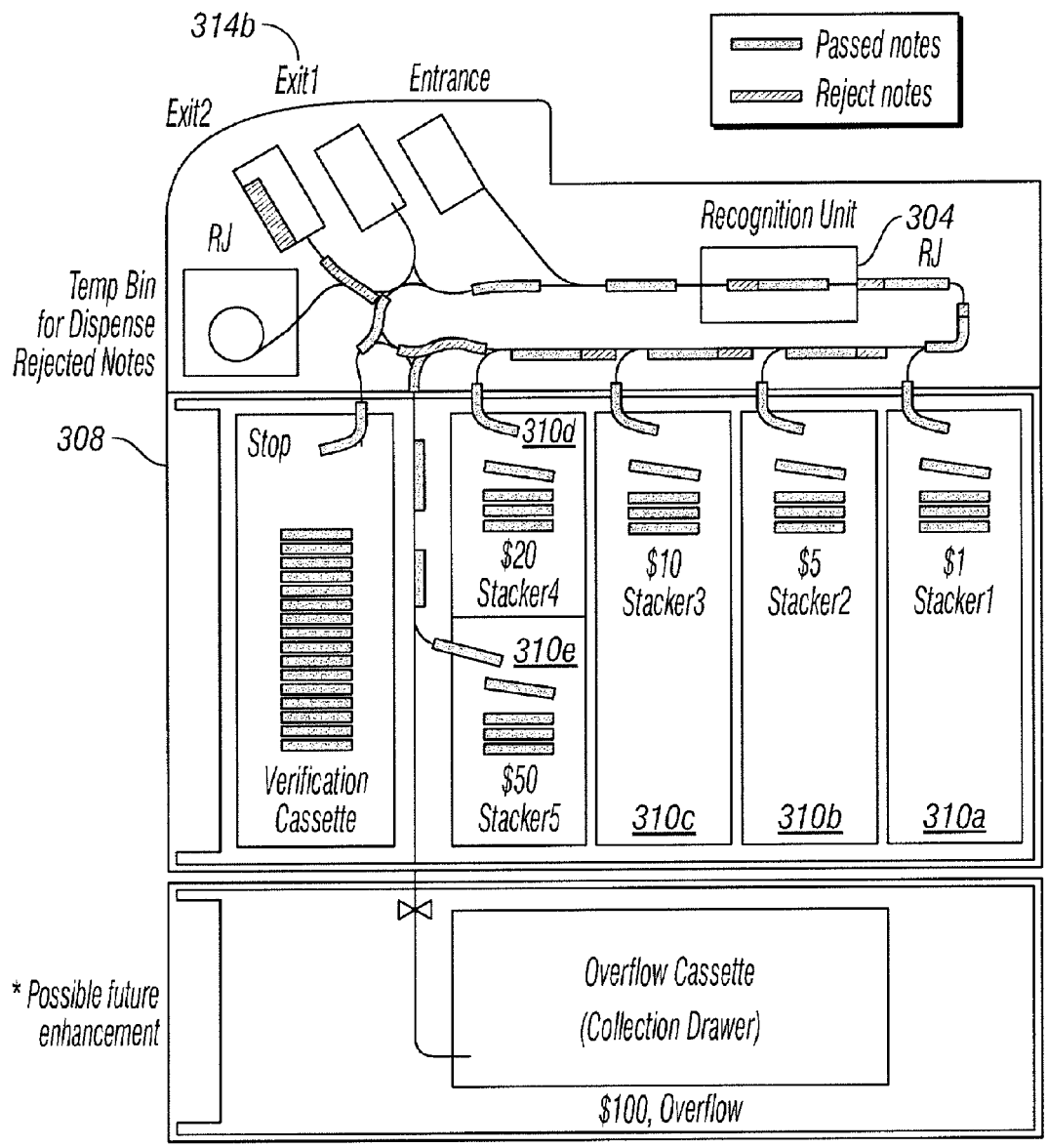
FIG. 13 depicts the hardware components of the currency recycler, during a cash load from a verification cassette, according to one or more embodiments shown and described herein.

FIG. 13 depicts the hardware components of the currency recycler 104, during a cash load from a verification cassette 308, according to one or more embodiments shown and described herein. As illustrated, currency may be retrieved from the verification cassette 308 and sent to the recognition unit 304. The recognition unit 304 can determine the validity of the notes. The valid notes may be sent to the stackers 310, while the invalid notes may be sent to the second exit 314b.

Figure 14:
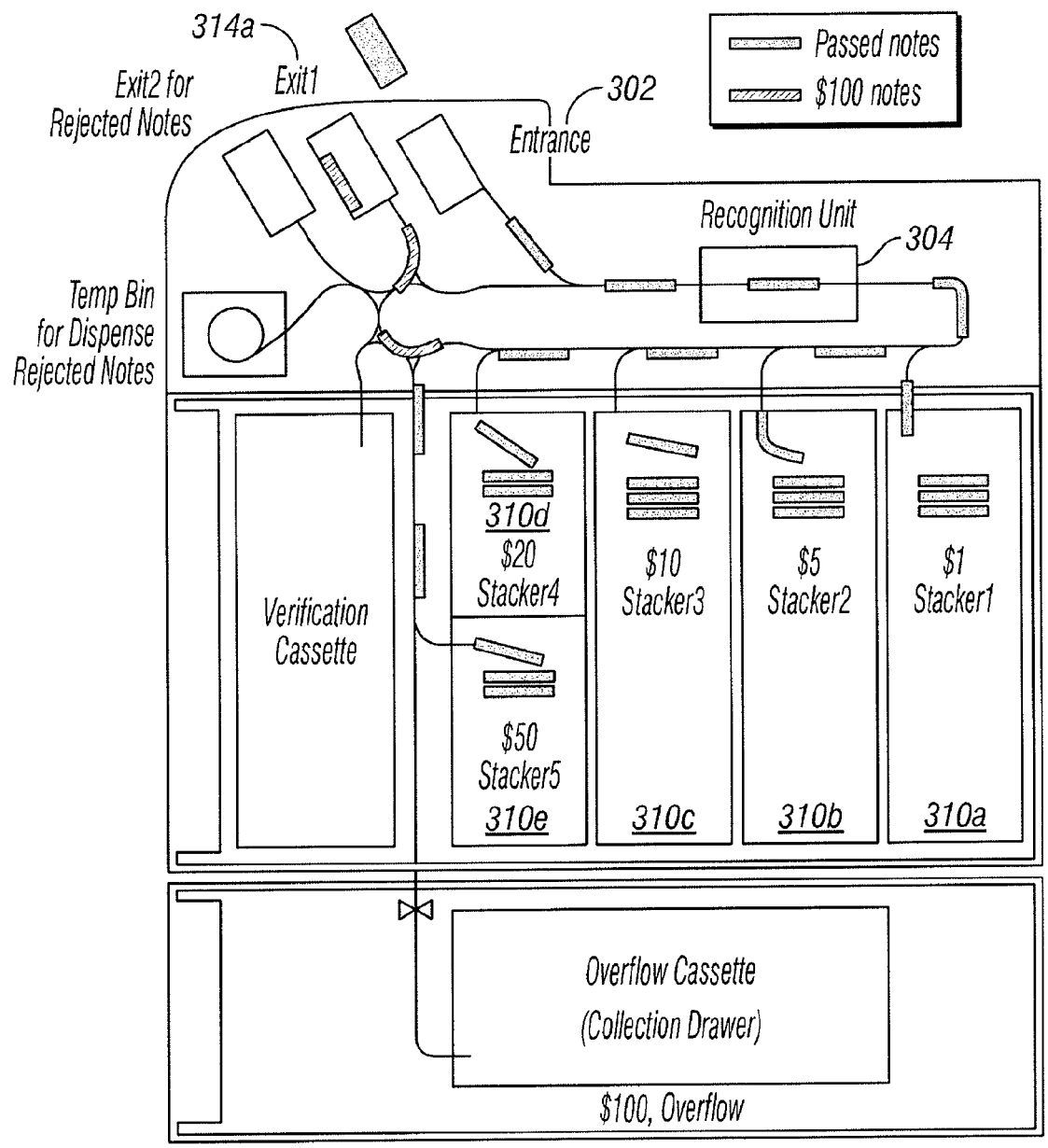
FIG. 14 depicts the hardware components of the currency recycler during a cash load from an upper unit, according to one or more embodiments shown and described herein.

FIG. 14 depicts the hardware components of the currency recycler 104 during a cash load from an upper unit, according to one or more embodiments shown and described herein. As illustrated, currency may be received at the entrance 302 and sent to the recognition unit 304. The recognition unit 304 may determine the validity of the currency and send the valid notes to the stackers 310. The invalid notes may be sent to the first exit 314a.

Figure 15:
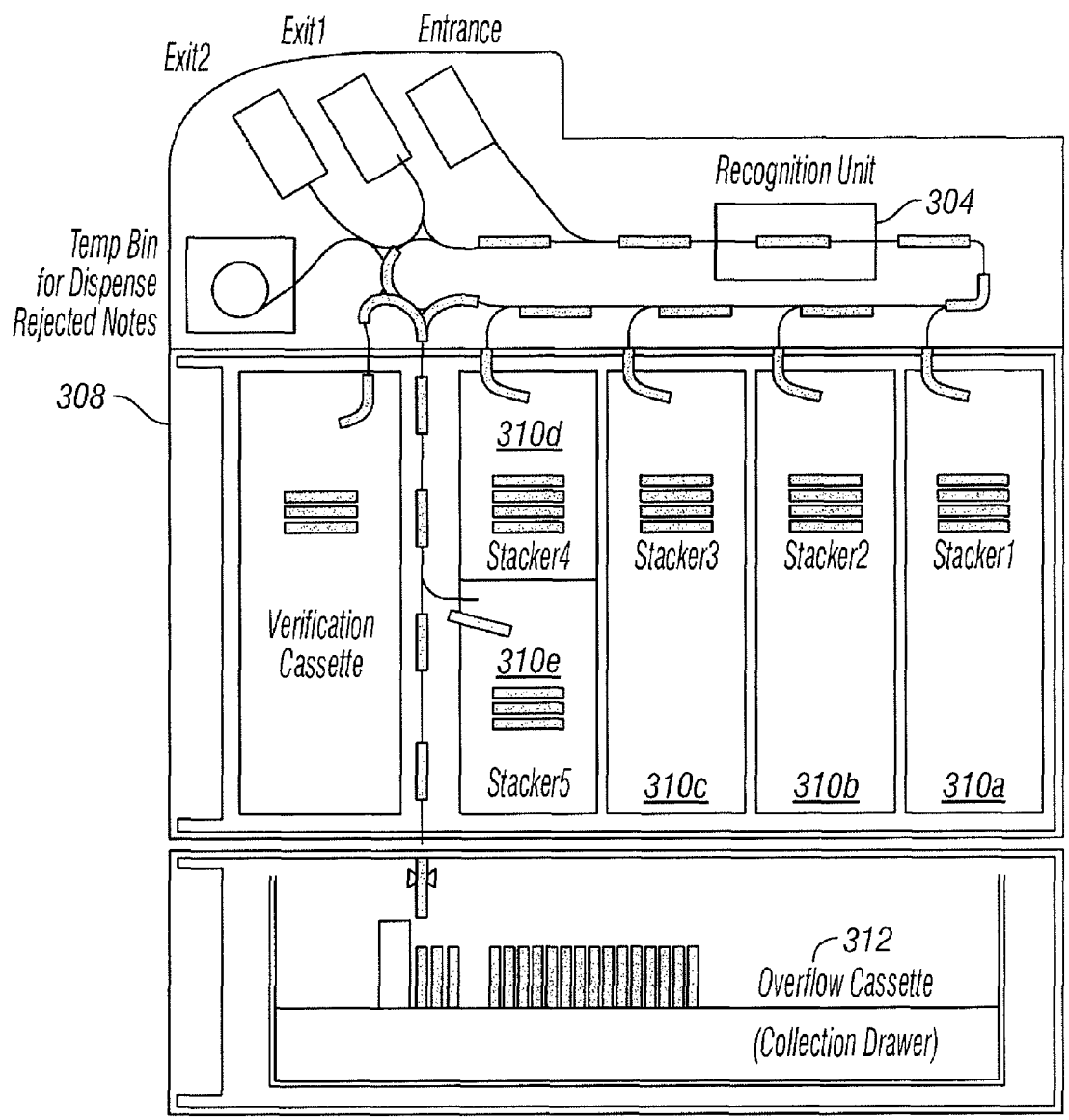
FIG. 15 depicts the hardware components of the currency recycler during a target level maintenance, according to one or more embodiments shown and described herein.

FIG. 15 depicts the hardware components of the currency recycler 104 during a target level maintenance, according to one or more embodiments shown and described herein. In some embodiments, routine maintenance may be performed on the currency recycler 104 to maintain desired levels of currency. As such, currency may reside in the stackers 310, the overflow cassette 312, and/or the verification cassette 308. Currency may be sent from the stackers to the recognition unit 304 for distribution to the verification cassette 308 and/or the overflow cassette 312. Similarly, currency may be sent form the overflow cassette 312 to the stackers 310 and/or the verification cassette 308 and/or from the verification cassette 308 to the stackers 310 and/or overflow cassette 312.

Figure 16:
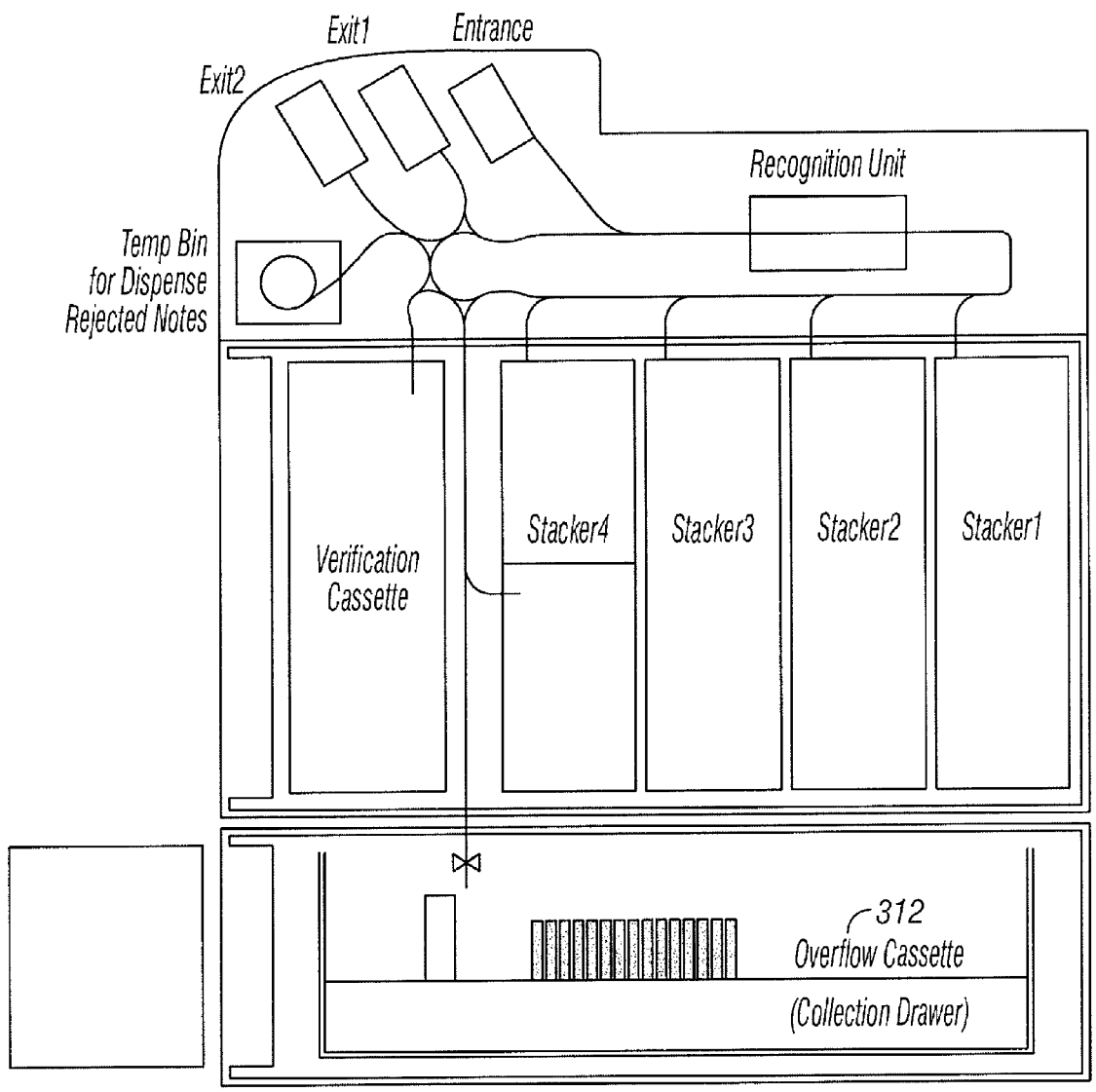
FIG. 16 depicts the hardware components of the currency recycler during a collection cassette pickup, according to one or more embodiments shown and described herein.

FIG. 16 depicts the hardware components of the currency recycler 104 during a collection cassette pickup, according to one or more embodiments shown and described herein. As illustrated, once the currency is sent to the overflow cassette 312 for pickup, authorized personnel may retrieve the currency from the overflow cassette 312.

Figure 17:
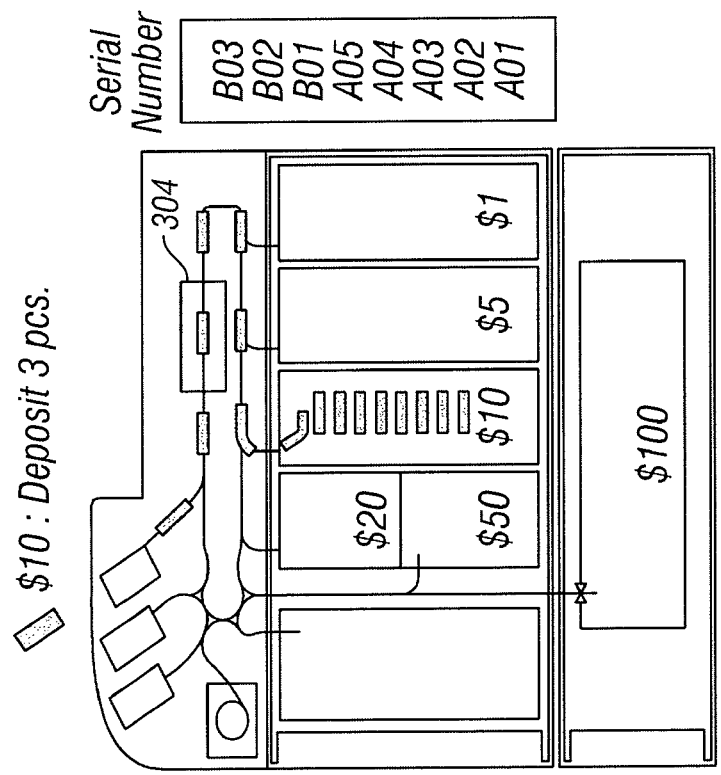
FIG. 17 depicts the hardware components of the currency recycler, further illustrating serial number recognition flow, according to one or more embodiments shown and described herein.

FIG. 17 depicts the hardware components of the currency recycler 104, further illustrating serial number recognition flow, according to one or more embodiments shown and described herein. As illustrated, during a deposit, the recognition unit 304 may determine serial numbers of the notes to determine their validity. The serial numbers may be stored for later use.

Figure 18:
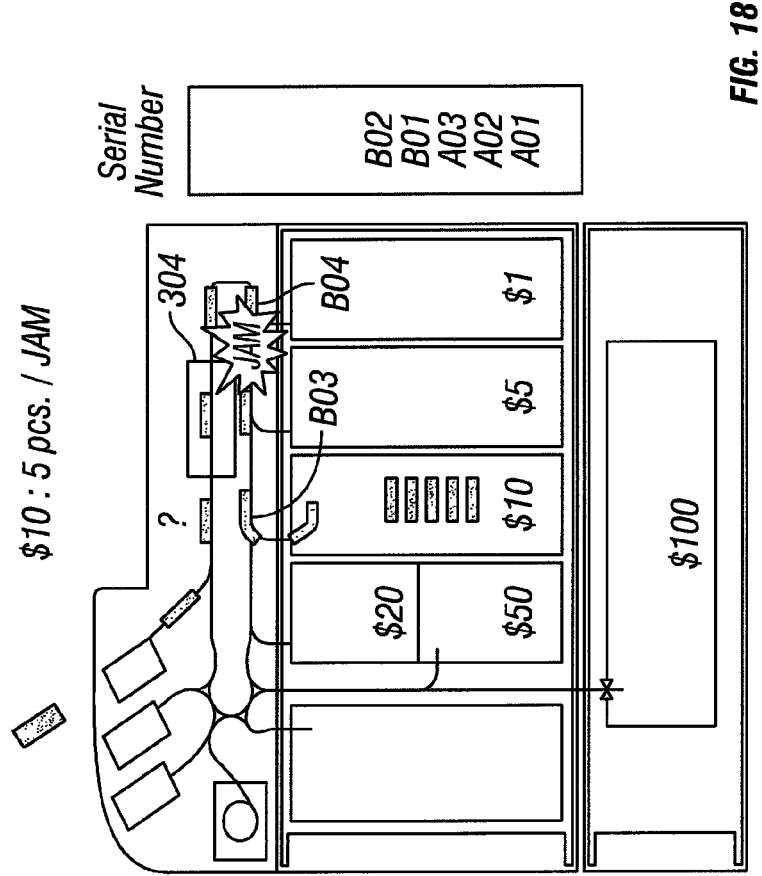
FIG. 18 depicts the hardware components of the currency recycler during a deposit jam, according to one or more embodiments shown and described herein.

FIG. 18 depicts the hardware components of the currency recycler 104 during a deposit jam, according to one or more embodiments shown and described herein. As illustrated, when a deposit jam occurs, a determination may be made regarding which note is jammed, based on identifying the notes that have been processed by the recognition unit 304.

Figure 19:
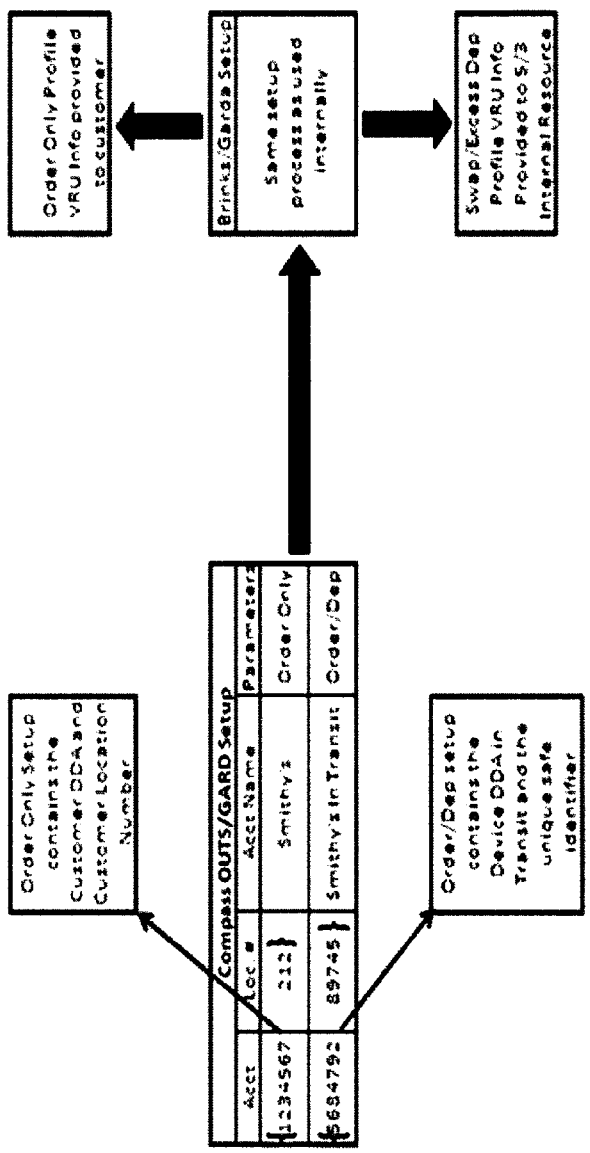
FIG. 19 depicts a diagram illustrating implementation setup, according to one or more embodiments shown and described herein.

FIG. 19 depicts a diagram illustrating implementation setup, according to one or more embodiments shown and described herein. As illustrated, an account lookup table may be accessed to determine account numbers, location, account name, and/or parameters. Additionally, an order only setup may contain the customer DDA and customer location number. The order Dep setup may contain the device DDA in transit and the unique safe identifier. The Brinks/Garda setup may be a similar process as used internally. The order only profile VRU information may be provided to the customer. The swamp/excess Dep profile VRU information may be provided to the financial institution internal resource.

Figure 20:
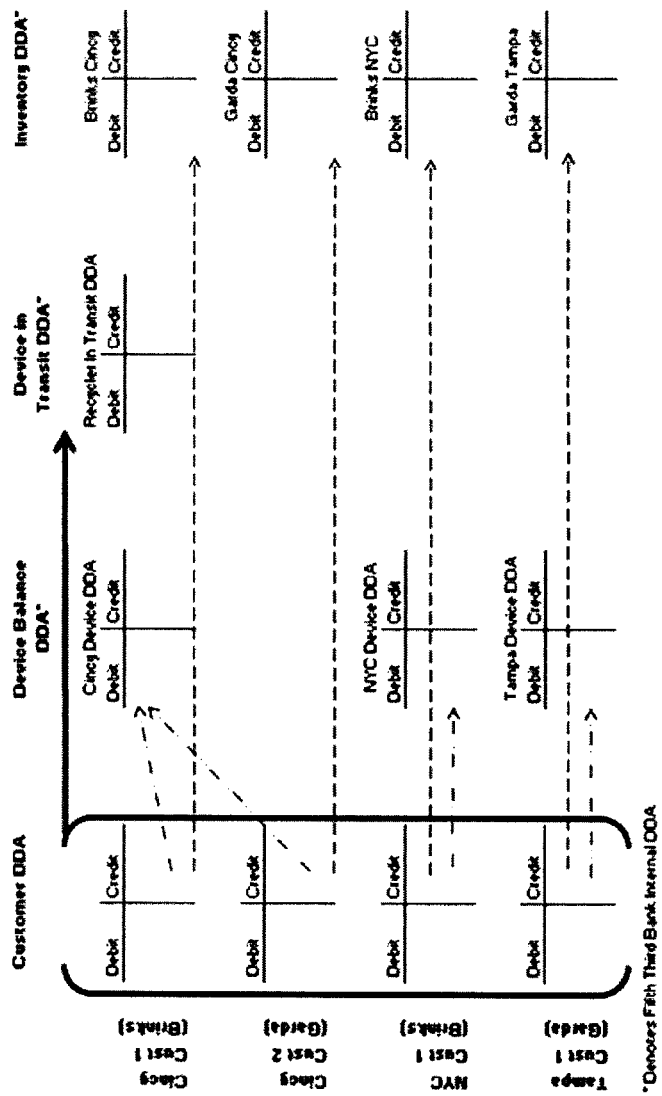
FIG. 20 depicts a diagram illustrating the currency recycler account structure, according to one or more embodiments shown and described herein.

FIG. 20 depicts a diagram illustrating the currency recycler 104 account structure, according to one or more embodiments shown and described herein. As illustrated, the currency recycler 104 account structure may include the customer DDA, which may be unique for each individual retail location and/or may be shared among retail locations, depending on customer preference. Also included is a device balance DDA, which is the financial institution internal DDA. A device in transit DDA is additionally included, which may be built at the product level and may not be vendor-specific. An inventory DDA may also be included for each cash processing market and is vendor specific.

FIG. 21 depicts a diagram illustrating transaction types for the currency recycler 104, according to one or more embodiments shown and described herein. As illustrated, the currency recycler 104 transaction types include a customer DDA (retail store), an in-process (Fed) account, a device balance DDA (retail store), a device in transit, and an inventory DDA. These fields may receive both customer transactions and vendor transactions.

Figure 22:
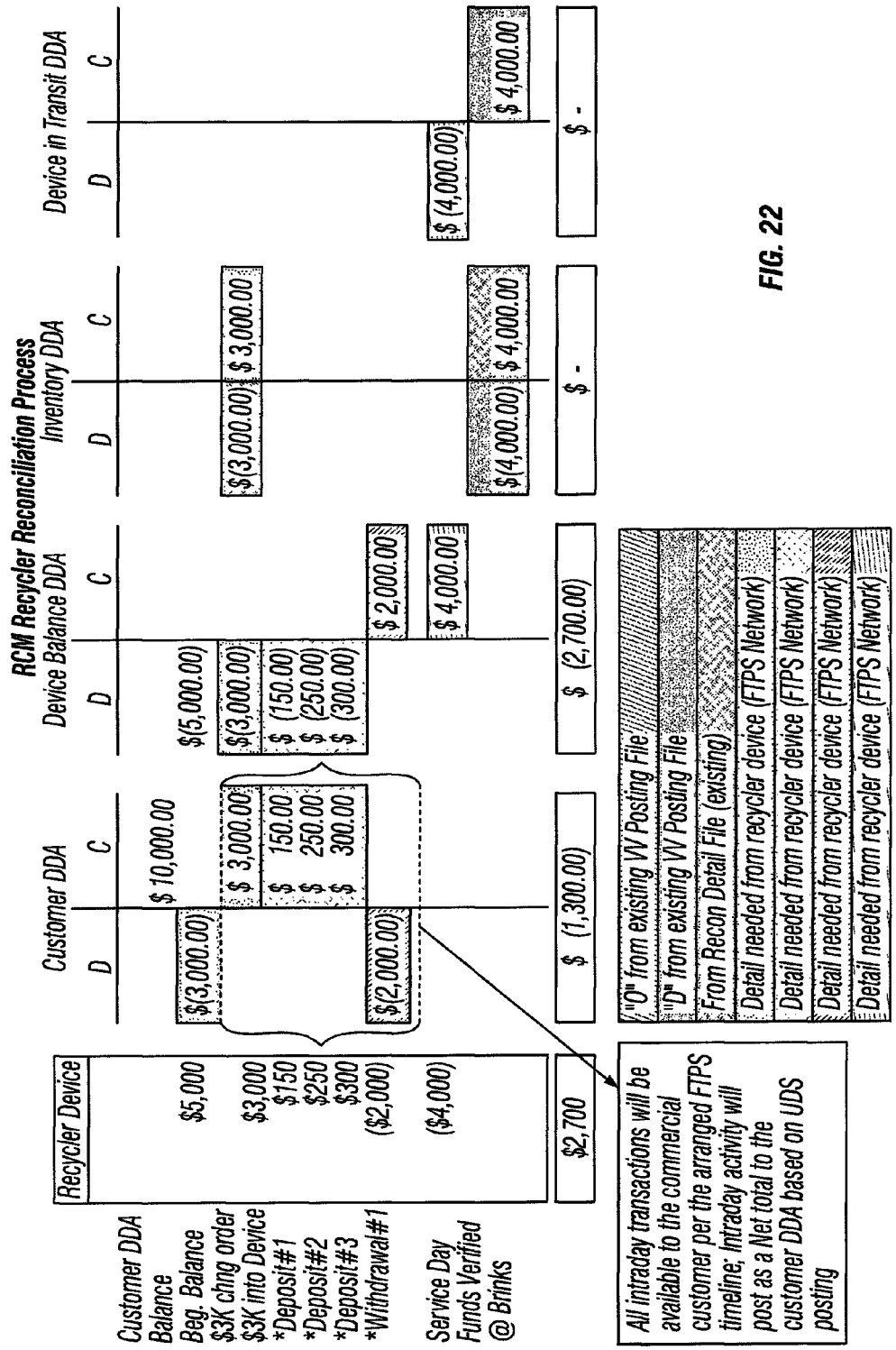
FIG. 22 depicts a diagram illustrating a reconciliation process for the currency recycler, according to one or more embodiments shown and described herein.

FIG. 22 depicts a diagram illustrating a reconciliation process for the currency recycler 104, according to one or more embodiments shown and described herein. As illustrated, FIG. 22 depicts balances for a currency recycler 104 for customer DDA, device balance DDA, inventory DDA, and device in transit DDA.

FIG. 23 depicts a diagram illustrating a fill/empty process for the currency recycler 104, according to one or more embodiments shown and described herein. As illustrated, the currency recycler 104 fill/empty process may include an indication of when currency is removed from the currency recycler 104, when money is processed in the vendor currency room, and when a reconciliation detail record is received.

FIG. 24 depicts a diagram illustrating customer transactions with the currency recycler 104, according to one or more embodiments shown and described herein. As illustrated, included are a market field, date field, a currency recycler field, a previous day cash field, a customer deposits field, a customer withdrawals field, an adjustments field, a vendor empty field, a vendor fill field, a current cash field, an end of day cash position field, and a difference field.

Figure 25:
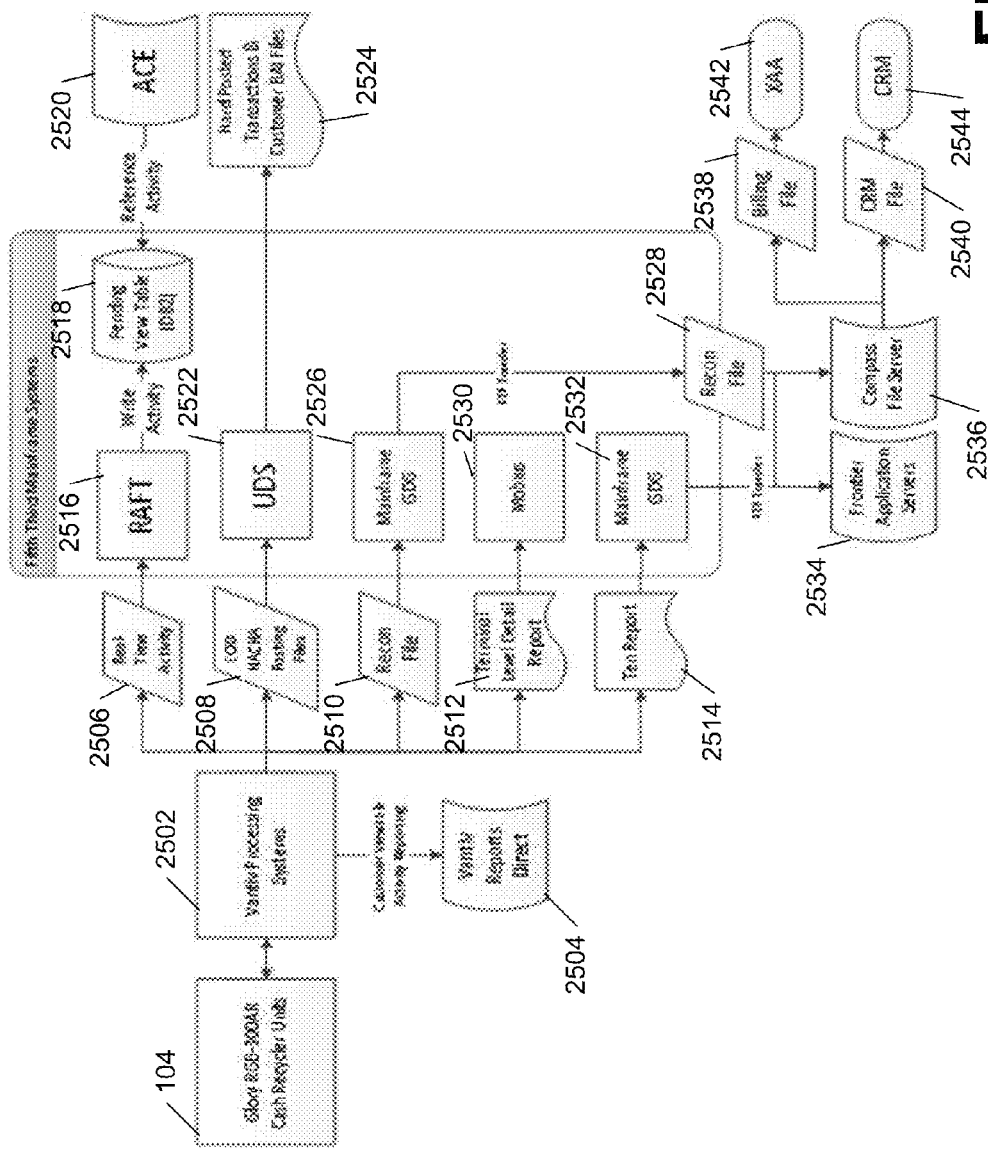
FIG. 25 depicts a flowchart illustrating operation of the currency recycler, according to one or more embodiments shown and described herein.

FIG. 25 depicts a flowchart illustrating operation of the currency recycler 104 in conjunction with an example remote computing device 102, according to one or more embodiments shown and described herein. As illustrated a currency recycler 104 may communicate with a processing system 2502. The processing system 2502 may send customer viewable reports to a reports direct component 2504. Additionally, in the embodiment shown, the processing system 2502 may report real time activity 2506 to a reliable automated funds transfer ("RAFT") component 2516, which stores customer relationship information and writes customer pending activities to a table 2518. In this example, the table 2518 may also receive reference activity, such as from queries, from an a front end user interface 2520 (labeled "ACE" in this example).

The processing system 2502 may additionally send posting files to a universal deposit system ("UDS") component 2522, which stores customer checking and saving account information that could include creation of hard posted transactions and customer files 2524. In the embodiment shown, the processing system 2502 may also send files 2510 to a mainframe 2526, which in this embodiment, file transfer protocol ("FTP") transfers the file to a cash vault management application 2536 for customer profiles and billing (labeled "compass file server"). The processing system 2502 may also send a terminal level detail report to a reporting engine 2530 (labeled "mobius"). The processing system 2502 may additionally send a ten report 2514 to a mainframe 2532, which in this example, FTP transfers the data to a reconciliation program (labeled "frontier application servers") and to the cash vault management application (labeled "compass file server") 2536. The cash vault management application 2536 may send a billing file 2538 to an extended account analysis application (labeled "xaa") 2542 and a customer relationship management ("CRM") file 2540 to a CRM application 2544.

Figure 26:
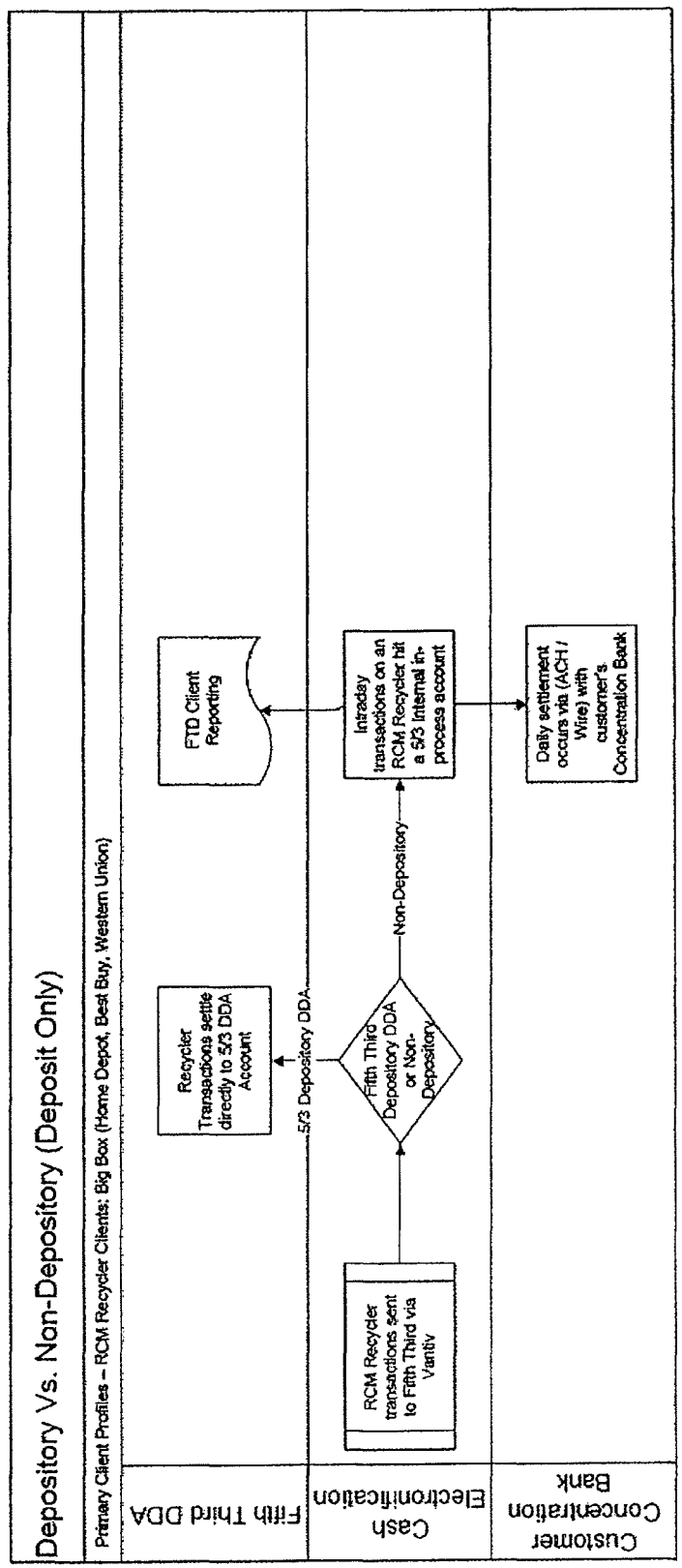
FIG. 26 depicts a flowchart illustrating operation of depository versus non-depository transactions, according to one or more embodiments shown and described herein.

FIG. 26 depicts a flowchart illustrating operation of depository versus non-depository transactions, according to one or more embodiments shown and described herein. As illustrated, cash electronification actions may include the currency recycler 104 transactions sent to the financial institution via a third party. A determination may then be made regarding whether the transaction is a financial institution depository DDA or non-depository. If the transaction is depository, the currency recycler 104 transactions may settle directly to the financial institution DDA account. If the transaction is non-depository, intraday transactions on the currency recycler 104 may hit a financial institution internal in-process account. The daily settlement with the customer's financial institution may then occur.

Figure 27:
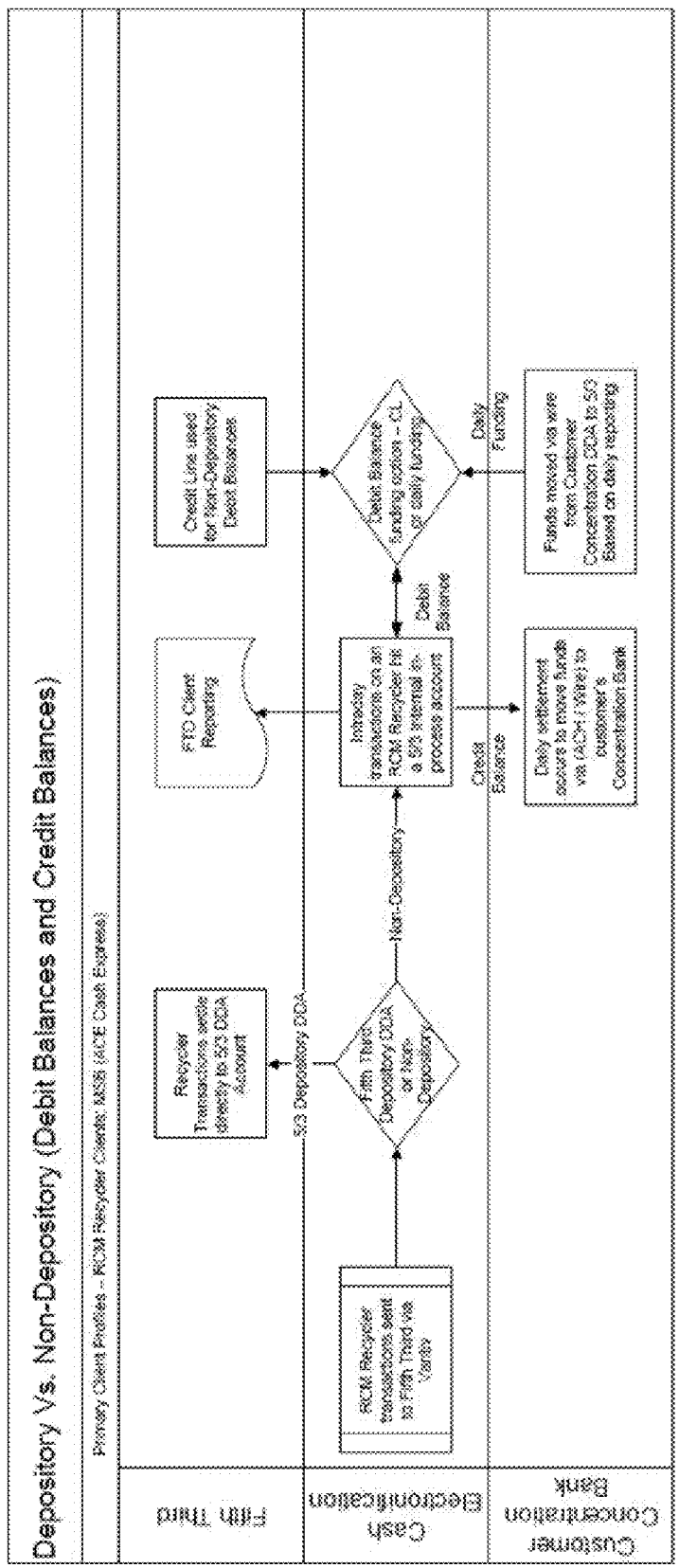
FIG. 27 depicts a flowchart illustrating depository versus non-depository debit and credit balances, according to one or more embodiments shown and described herein.

FIG. 27 depicts a flowchart illustrating depository versus non-depository debit and credit balances, according to one or more embodiments shown and described herein. As illustrated, the currency recycler 104 transactions may be sent to the financial institution via a third party. A determination may then be made regarding whether the transaction is depository or non-depository. If the transaction is depository, the currency recycler 104 transactions may settle directly to the financial institution DDA account. If the transaction is non-depository, the intraday transactions on the currency recycler 104 may hit an internal in-process account of the financial institution and a daily settlement may occur to move funds to the customer's financial institution. Additionally, a determination may be made regarding whether the transaction includes a debit balance funding option or a daily funding. A credit line may be used for non-depository debit balances and funds via a wire from the customer to the financial institution may be moved, based on daily reporting.

Figure 28:
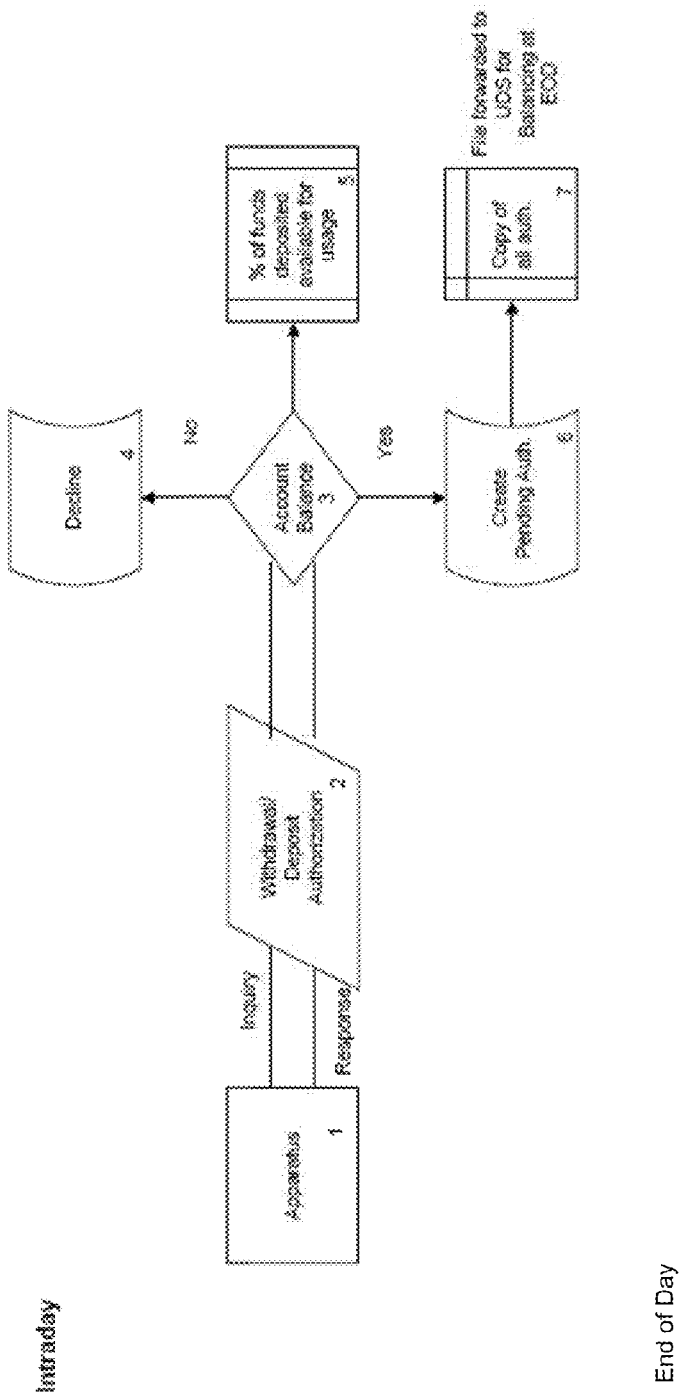
FIG. 28 depicts a flowchart illustrating intraday operation of the currency recycler, according to one or more embodiments shown and described herein.

FIG. 28 depicts a flowchart illustrating intraday operation of the currency recycler 104, according to one or more embodiments shown and described herein. As illustrated, at the apparatus block the currency recycler 104 receives a retailer request for deposits and/or withdrawals at the currency recycler 104, which creates messaging for these inquiries. The messages may be sent to the financial institution. Additionally, the currency recycler 104 can receive a response back from the financial institution. At the withdrawal/deposit authorization block, authorization data (such as a PIN) is received from the retailer at the currency recycler 104, which is communicated through ATM networks to provide authorization. At the account balance block, a determination is made regarding whether there are sufficient funds in the retailer's account to complete the transaction. If not, at the decline block, the transaction may be declined. If funds are available, but preset parameters limit the transaction, the process proceeds to the percentage of funds block, where a percentage of the funds may be available to the retailer. If, at the account balance block, a determination is made that the funds are fully available, the process may proceed to the create pending authorization block, where the transaction may be processed and a pending message is created and stored for end of the day processing. At the copy of authorization block, a copy of the preliminary authorization is stored and all such authorizations are forwarded to the financial institution for settlement processing. Upon processing by the financial institution, the transaction is complete.

Figure 29:
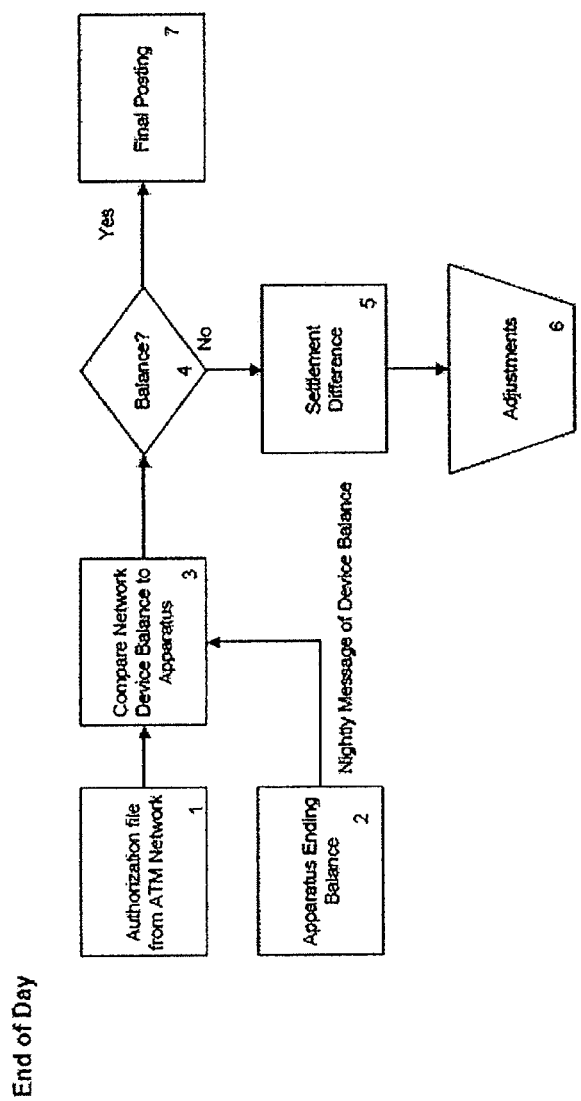
FIG. 29 depicts a flowchart illustrating end of day transactions of the currency recycler, according to one or more embodiments shown and described herein.

FIG. 29 depicts a flowchart illustrating end of day transactions of the currency recycler 104, according to one or more embodiments shown and described herein. More specifically, pending authorizations may be received from an ATM network provider. An ending day balance may be received from the currency recycler 104. A comparison of the files from the device and ATM network may be performed to reconcile the account balances between the client and the device. Decision point may be performed for determining balanced records. If not balanced, differences in the settlement process are identified in the frontier system. Accounting may research and resolve differences through an adjustment process. If there is balance, a final posting may be performed for the accounts.

Figure 30:
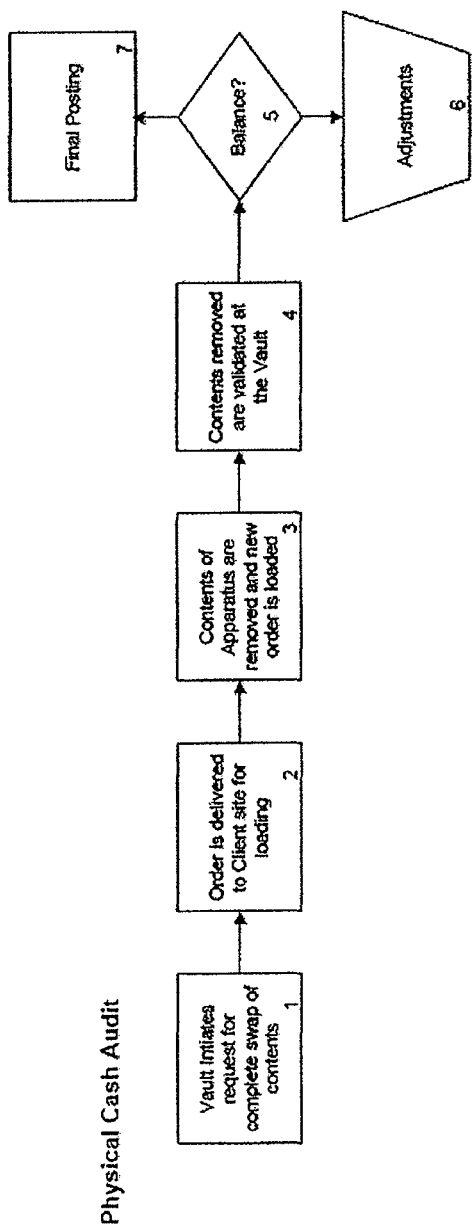
FIG. 30 depicts a flowchart illustrating a physical cash audit of the currency recycler, according to one or more embodiments shown and described herein.

FIG. 30 depicts a flowchart illustrating a physical cash audit of the currency recycler 104, according to one or more embodiments shown and described herein. As illustrated, accounting initiates a complete cash swap (change order) of the device. An armored car vendor may deliver the change order to client's location. Contents of the machine may be removed from the currency recycler 104 and the change order may be deposited into the currency recycler 104. Armored car courier delivers contents that were removed from the currency recycler 104 to the vault location for verification. A determination may be made regarding whether the contents are balanced with the respective accounting records. If not, differences will be handled as adjustments by either adjusting internal entries or the customer account. Verification is complete once records have been balanced. If so, final posting may be performed.

Figure 31:
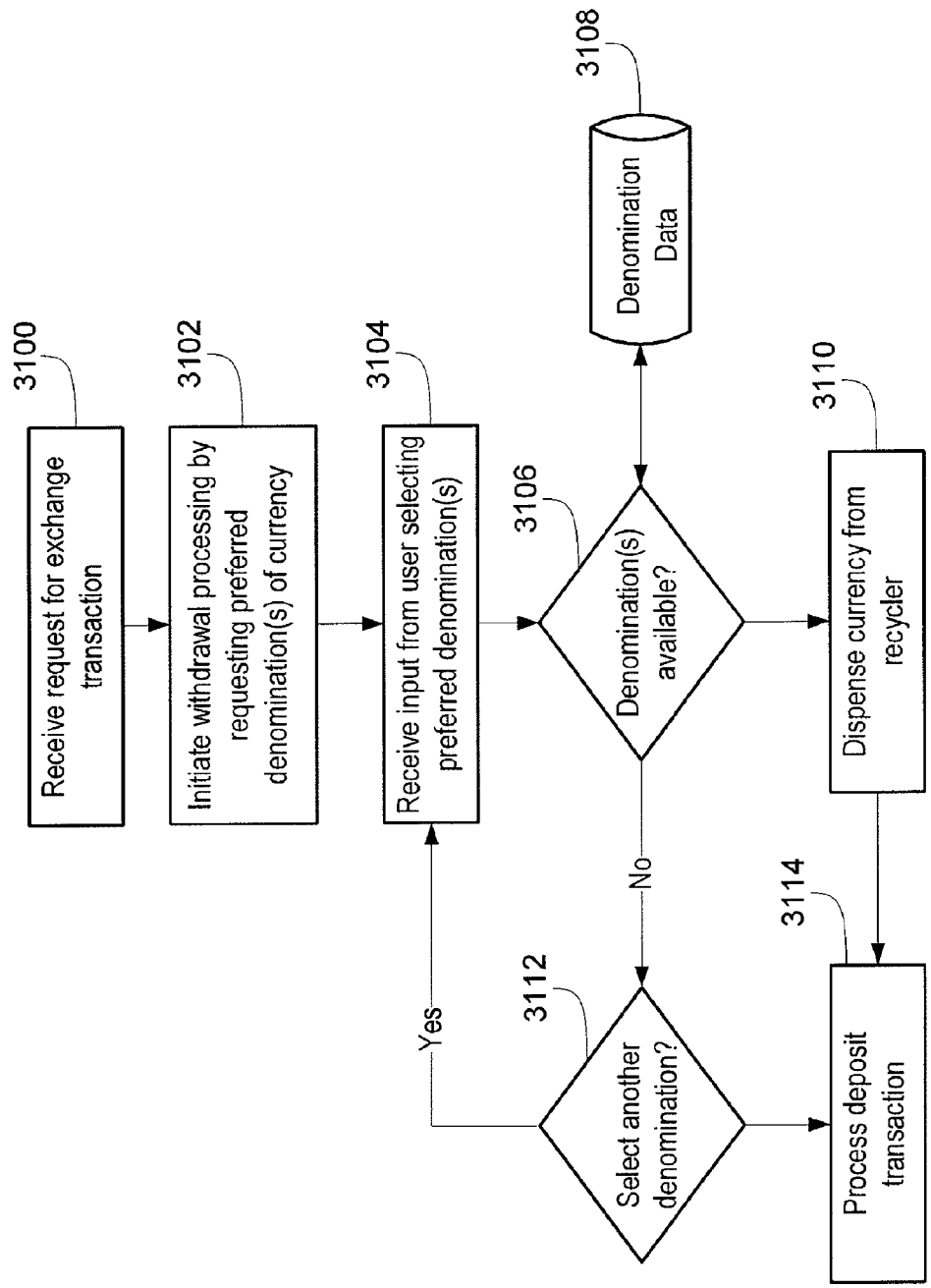
FIG. 31 depicts a flowchart illustrating an example exchange transaction of the currency recycler according to one or more embodiments shown and described herein.

FIG. 31 depicts a flowchart illustrating an exchange transaction of the currency recycler 104, according to one or more embodiments shown and described herein. In this embodiment, the user has selected to initiate an exchange transaction (block 3100), for example by selecting an exchange transaction through the input hardware 232 on the currency recycler 104. An exchange transaction is generally one in which the user would like to obtain certain denominations of currency in exchange for a different denomination. Consider an example in which the user has a $20 bill and would like to exchange this for twenty $1 bills. In existing systems, the user would start with a deposit of the $20 bill and then attempt to receive a withdrawal of twenty $1 bills. However, one shortcoming of this approach arises when the denomination desired by the user is unavailable. For example, if only eighteen $1 bills are available, existing systems would receive the $20 bill deposit, then dispense eighteen $1 bills and credit the account by $2, which is not what was desired by the user. In this embodiment, the exchange transaction of the currency recycler 104 starts with the withdrawal of the desired denomination(s) before depositing any money (block 3102). This allows the user to first select the desired denomination(s), such as twenty $1 bills, using the input hardware 232 (block 3104). The recycler is configured to determine whether the desired denomination(s) are available (block 3106), such as by using the data storage element 236 (block 3108). If the desired denomination(s) are available, the desired denomination(s) are dispensed to the user (block 3110) before starting the deposit transaction (block 3114). In the above example, the user would be alerted to the fact that the recycler does not have twenty $1 bills and ask whether the user would like to select different denomination(s) (block 3112). This provides the user with an opportunity to select, for example, one $5 bill and fifteen $1 bills. Once the desired denomination(s) are selected and determined to be available, this is dispensed to the user (block 3110). At that time, the user deposits the money for exchange, which would be the $20 bill in this example (block 3114).

FIGS. 32 and 33 show example receipts that could be issued from the currency recycler 104 in conjunction with manual processing of coinage and checks, respectively. In this embodiment, a user may select a manual processing transaction from the currency recycler 104. This allows the user to deposit coinage and/or checks and receive provisional credit for these items. In this embodiment, the currency recycler 104 is configured to provide a net credit for all validated and manually deposited cash and coins and a second net credit for all manually deposited checks that will be posted to the user's account. Consider an example in FIG. 32 in which the user has performed a manual deposit of one $100 bill, two $20 bills, six $1 bills, one quarter, one dime, three nickels, and three pennies for a total manual deposit of $146.53, for which the user will be provided provisional credit. As shown in this example receipt, the user may enter the cash register from which this money came, which could be reconciled with the customer's point of sale system. Likewise, in the example receipt illustrated in FIG. 33, the user is allowed to deposit multiple checks for a total declared value of $558.43. In this example, the customer's account will be provided a provisional credit for $558.43, which is the amount declared for these checks. If the example above with respect to the manual deposit of $146.53 in cash and $558.43 occurred on the same day, the customer would receive a combined provisional credit for these two manual deposits.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A currency recycler comprising:
  a housing including a plurality of stackers disposed within the housing and configured to hold currency;
  a processor located within the housing;
  a currency routing assembly disposed within the housing and in communication with the processor and configured to move currency received through an entrance of the housing to one or more of the stackers responsive to commands from the processor, wherein the currency routing assembly is configured to move selected currency from one or more of the stackers to an exit of the housing;
  a display communicably linked to the processor;
  an input device configured to select one or more options presented on the display;
  a network interface operably connected to the processor;
  a memory element coupled to the processor, the memory storing instructions to direct the processor to perform operations comprising:
    present a plurality of transaction types for selection by a user on the display, wherein the plurality of transaction types includes one or more of an exchange transaction and a manual processing transaction;
    responsive to receiving a selection of the exchange transaction using the input device, initiating a withdrawal transaction by which the user is prompted for selection of a withdrawal amount and a preferred denomination;
    responsive to the selection of the withdrawal amount and the preferred denomination, determining whether the preferred denomination is available and if the preferred denomination is not available, prompting for selection of another denomination until a preferred denomination is determined to be available;
    dispensing the withdrawal amount in the form of the preferred denomination; and
    accepting the withdrawal amount in a deposit transaction.

2. The currency recycler as recited in claim 1, responsive to receiving a selection of the exchange transaction using the input device, receiving a preferred denomination of the selected withdrawal amount from the user.

3. The currency recycler as recited in claim 2, responsive to receiving the preferred denomination of the selected withdrawal amount, determining whether the preferred denomination is available in one or more of the stackers.

4. The currency recycler as recited in claim 3, responsive to a determination that the preferred denomination is not available, displaying an alert on the display that the preferred denomination is not available.

5. The currency recycler as recited in claim 4, responsive to a determination that the preferred denomination is not available, presenting a request for a new selection of the preferred denomination.

6. The currency recycler as recited in claim 1, responsive to receiving a selection of the manual processing transaction using the input device, storing an amount for a declared amount of one or more coins supplied through the entrance and printing a receipt indicating a provisional credit for the declared amount.

7. The currency recycler as recited in claim 1, responsive to receiving a selection of the manual processing transaction using the input device, storing an amount for a declared amount of one or more checks supplied through the entrance and printing a receipt indicating a provisional credit for the declared amount.

8. A non-transitory, computer readable storage medium storing a program for performing an exchange transaction on a currency recycler, according to a process comprising:
  presenting a plurality of transaction types for selection by the user on a display, wherein the plurality of transaction types includes one or more of an exchange transaction;
  responsive to receiving a selection of the exchange transaction:
    prompting for selection of a withdrawal amount and a preferred denomination;
    determining whether the preferred denomination is available;
    responsive to a determination that the preferred denomination is not available, prompting for selection of another denomination until a preferred denomination is determined to be available;

dispensing the withdrawal amount in the form of the preferred denomination; and accepting the withdrawal amount in a deposit transaction.

9. The non-transitory, computer readable storage medium of claim 8, wherein the accepting step occurs after the dispensing step.

* * * * *